US007746399B2

(12) United States Patent
Itoh et al.

(10) Patent No.: US 7,746,399 B2
(45) Date of Patent: Jun. 29, 2010

(54) IMAGE PICK-UP DEVICE

(75) Inventors: Hiroshi Itoh, Hachioji (JP); Seisuke Matsuda, Hachioji (JP); Shigeru Hosokai, Hachioji (JP); Yuichi Gomi, Hachioji (JP); Yoshio Hagihara, Hachioji (JP)

(73) Assignee: Olympus Corporation, Tokyo (JP)

( * ) Notice: Subject to any disclaimer, the term of this patent is extended or adjusted under 35 U.S.C. 154(b) by 925 days.

(21) Appl. No.: 10/831,527

(22) Filed: Apr. 23, 2004

(65) Prior Publication Data
US 2005/0018064 A1 Jan. 27, 2005

(30) Foreign Application Priority Data
Apr. 28, 2003 (JP) ............................. 2003-124309

(51) Int. Cl.
H04N 3/15 (2006.01)
H04N 5/335 (2006.01)

(52) U.S. Cl. ..................................................... 348/302

(58) Field of Classification Search ................ 348/294, 348/302, 303, 304, 308; 250/208.1
See application file for complete search history.

(56) References Cited

U.S. PATENT DOCUMENTS

| 4,959,723 | A | * | 9/1990 | Hashimoto | ................... | 348/308 |
| 5,144,447 | A | * | 9/1992 | Akimoto et al. | ............. | 348/303 |
| 5,693,932 | A | * | 12/1997 | Ueno et al. | .................. | 348/308 |
| 5,818,526 | A | * | 10/1998 | Nomoto | ...................... | 348/302 |
| 6,023,293 | A | * | 2/2000 | Watanabe et al. | ........... | 348/294 |
| 6,486,912 | B1 | * | 11/2002 | Aizawa et al. | .............. | 348/308 |
| 6,507,365 | B1 | * | 1/2003 | Inoue et al. | ................. | 348/302 |
| 6,798,451 | B1 | * | 9/2004 | Suzuki et al. | ............... | 348/294 |
| 6,914,632 | B1 | * | 7/2005 | Kim | ............................ | 348/308 |
| 7,030,356 | B2 | * | 4/2006 | Pain et al. | ................. | 250/208.1 |
| 7,030,920 | B1 | * | 4/2006 | Hayashi et al. | ............. | 348/302 |
| 2002/0067416 | A1 | * | 6/2002 | Yoneda et al. | .............. | 348/302 |
| 2003/0035059 | A1 | * | 2/2003 | Suzuki | ....................... | 348/304 |
| 2003/0193585 | A1 | * | 10/2003 | Ogura et al. | ................. | 348/272 |

FOREIGN PATENT DOCUMENTS

| JP | 07-203306 | 8/1995 |
| JP | 2000209503 | 7/2000 |
| JP | 2001-045378 | 2/2001 |
| WO | 03/017648 | 2/2003 |

* cited by examiner

Primary Examiner—Jason Whipkey
(74) Attorney, Agent, or Firm—Volpe and Koenig, P.C.

(57) ABSTRACT

A pixel portion of an image pick-up device having a pixel portion of pixels arranged in matrix converting a subject image to an electric signal, and a scanning unit of sub-scanning circuits outputting a video signal, a first scanning circuit selecting a pixel position in a first matrix direction and a second scanning circuit selecting a pixel position in a second direction intersecting the first direction. One of the first and second scanning circuits shares the signal lines. The image pick-up device includes a scanning control circuit controlling the first and second scanning circuits. The pixel area structures of the pickup device are uniform, the wirings are uniform, and the vertical and horizontal driving systems and an output system are uniform. Thus, pixel signals outputted from two output systems have no property differences and image quality is improved.

11 Claims, 21 Drawing Sheets

IMAGE PICK-UP DEVICE

CROSS REFERENCE TO RELATED APPLICATION(S)

This application claims benefit of Japanese Application No. 2003-124309 filed in Japan on Apr. 28, 2003, the contents of which are incorporated by this reference.

BACKGROUND OF THE INVENTION

1. Field of the Invention

The present invention relates to an image pick-up device of a multi-channel output system, with the multi channels having a uniform structure.

2. Description of the Related Art

An MOS solid-state image pick-up device adopts a multi-channel output system (multi-line output system) for simultaneously obtaining a plurality of video signal outputs in parallel therewith from a single image pick-up device, as a general method for obtaining a video signal at a high frame rate from an image pick-up device having millions of pixels.

FIG. 1 is an explanatory diagram of a multi-channel output system in a general MOS solid-state pick-up device according to a related art. Referring to FIG. 1, the solid-state pick-up device has (n×n) pixels.

Matrix-arranged pixels $P_{11}$ to $P_{nn}$ are divided into four areas. A divided-area-1 has an area ranging from $P_{11}$ to $P_{aa}$, a divided-area-2 has an area ranging from $P_{1b}$ to $P_{an}$, a divided-area-3 has an area ranging from $P_{b1}$ to $P_{na}$, and a divided-area-4 has an area ranging from $P_{bb}$ to $P_{nn}$.

A vertical scanning circuit 5 drives pixels on first to a-th rows, and a vertical scanning circuit 6 drives pixels on b-th to n-th rows. Horizontal reading circuits 1 and 3 read pixels on first to a-th columns, and horizontal reading circuits 2 and 4 read pixels on b-th to n-th columns.

Signal outputs are obtained from the pixels arranged in the respective divided-area-1 to divided-area-4, that is, the signal outputs from the pixels $P_{11}$ to $P_{aa}$ in the divided-area-1 are obtained by the horizontal reading circuit (also referred to as a horizontal scanning circuit) 1 and the vertical scanning circuit 5. The signal outputs from the pixels $P_{1b}$ to $P_{an}$ in the divided-area-2 are obtained by the horizontal reading circuit 2 and the vertical scanning circuit 5. The signal outputs from the pixels $P_{b1}$ to $P_{na}$ in the divided-area-3 are obtained by the horizontal reading circuit 3 and the vertical scanning circuit 6. The signal outputs from the pixels $P_{bb}$ to $P_{nn}$ in the divided-area-4 are obtained by the horizontal reading circuit 4 and the vertical scanning circuit 6.

FIG. 2 shows an image pick-up device for processing a plurality of video signal outputs as obtained as above according to the related art. The signals from the horizontal reading circuits 1 to 4 are supplied respectively to signal processing units 7 to 10. The signal processing units 7 to 10 have the same structure and comprise an amplifier and an AD converter, respectively. In the signal processing units 7 to 10, the respective input signals are amplified by the amplifiers, the amplified signals are converted into digital signals by the AD converters, and the digital signals are then supplied to an image memory 11. The image memory 11 stores and holds the signals from the signal processing units 7 to 10, and supplies the stored signals to a video signal processing unit (not shown) at the latter stage. The image memory 11 combines pixel signals in the divided-area-1 to divided-area-4, thus to form one image.

By the way, in the device with the above structure, the video signals in each of the divided-area-1 to divided-area-4 pass through signal processing systems individually comprising a scanning circuit and a video signal processing unit. Thus, the differences of electric properties among the signal processing systems cause the variation in signal level. Consequently, the quality of the finally-combined image degrades.

Then, Japanese Unexamined Patent Application Publication No. 2000-209503 (Patent Document 1) discloses the suggestion to solve the above-mentioned problem.

FIG. 3 is an explanatory diagram showing an image pick-up device disclosed in Japanese Unexamined Patent Application Publication No. 2000-209503 (Patent Document 1). The image pick-up device shown in FIG. 3 is a general MOS solid-state pick-up device.

The pixel arrangement of the image pick-up device shown in FIG. 3 is the same as that shown in FIG. 1. In the image pick-up device shown in FIG. 1, the pixels are included in one of the divided areas. However, the divided areas do not include any common pixel. On the contrary, in the image pick-up device shown in FIG. 3, the adjacent divided areas include common pixels. That is, in the example shown in FIG. 3, a divided-area-1 comprises pixels $P_{11}$ to $P_{bb}$, a divided-area-2 comprises pixels $P_{1a}$ to $P_{bn}$, a divided-area-3 comprises pixels $P_{a1}$ to $P_{nb}$, and a divided-area-4 comprises pixels $P_{aa}$ to $P_{an}$.

Horizontal reading circuits 15 to 18 respectively read the pixels in the divided-area-1 to divided-area-4. For example, the signals of the pixels $P_{aa}$ through $P_{bb}$ are outputted from the entire horizontal reading circuits 15 to 18. The signals of the pixels $P_{a1}$ and $P_{b1}$ are outputted from both of the horizontal reading circuits 15 and 17. The outputs from the overlapping-read pixels are averaged, to thus average the property variation in horizontal reading circuits at the boundary of the divided areas and to reduce image deterioration.

SUMMARY OF THE INVENTION

According to the present invention, an image pick-up device includes a pixel portion having a matrix arrangement of pixels corresponding to respective intersecting points between a plurality of signal lines arranged in a first direction and second direction, the pixel portion converting a subject image to an electric signal, and a scanning unit comprising a first scanning circuit for selecting a pixel position in a first direction of the matrix in the pixel portion and a second scanning circuit for selecting a pixel position in a second direction intersecting at the first direction, at least one of the first scanning circuit and the second scanning circuit having respectively a plurality of sub-scanning circuits for outputting a video signal, the plurality of sub-scanning circuits sharing the respective signal lines. Further, the image pick-up device includes a scanning control circuit for controlling the first scanning circuit and the second scanning circuit.

The above and other objects, features and advantages of the invention will become more clearly understood from the following description referring to the accompanying drawings.

DESCRIPTION OF THE PREFERRED EMBODIMENTS

Figure 1:
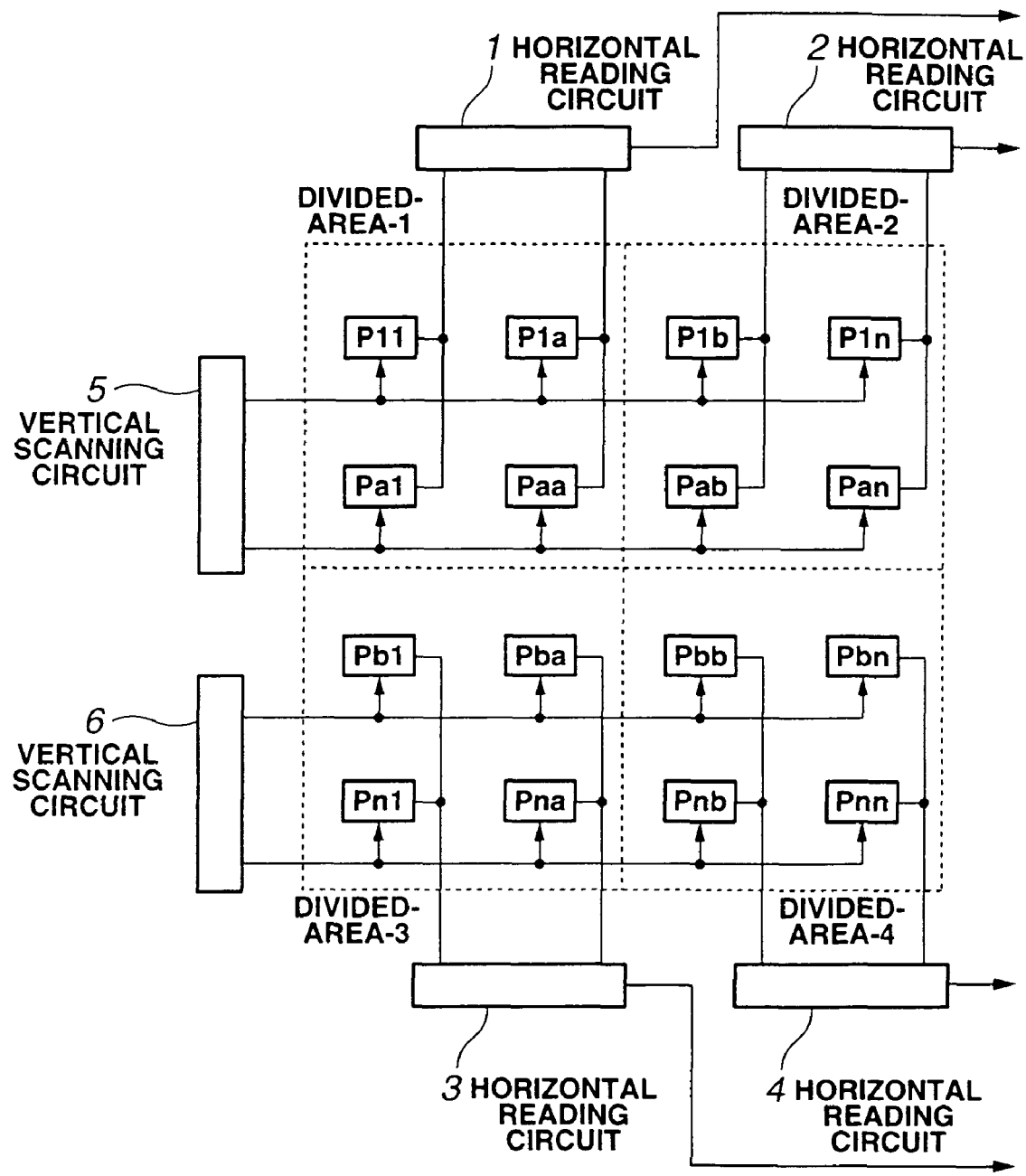
FIG. 1 is an explanatory diagram showing the structure of a general MOS solid-state pick-up device of a multi-channel output system according to one related art.
Figure 2:
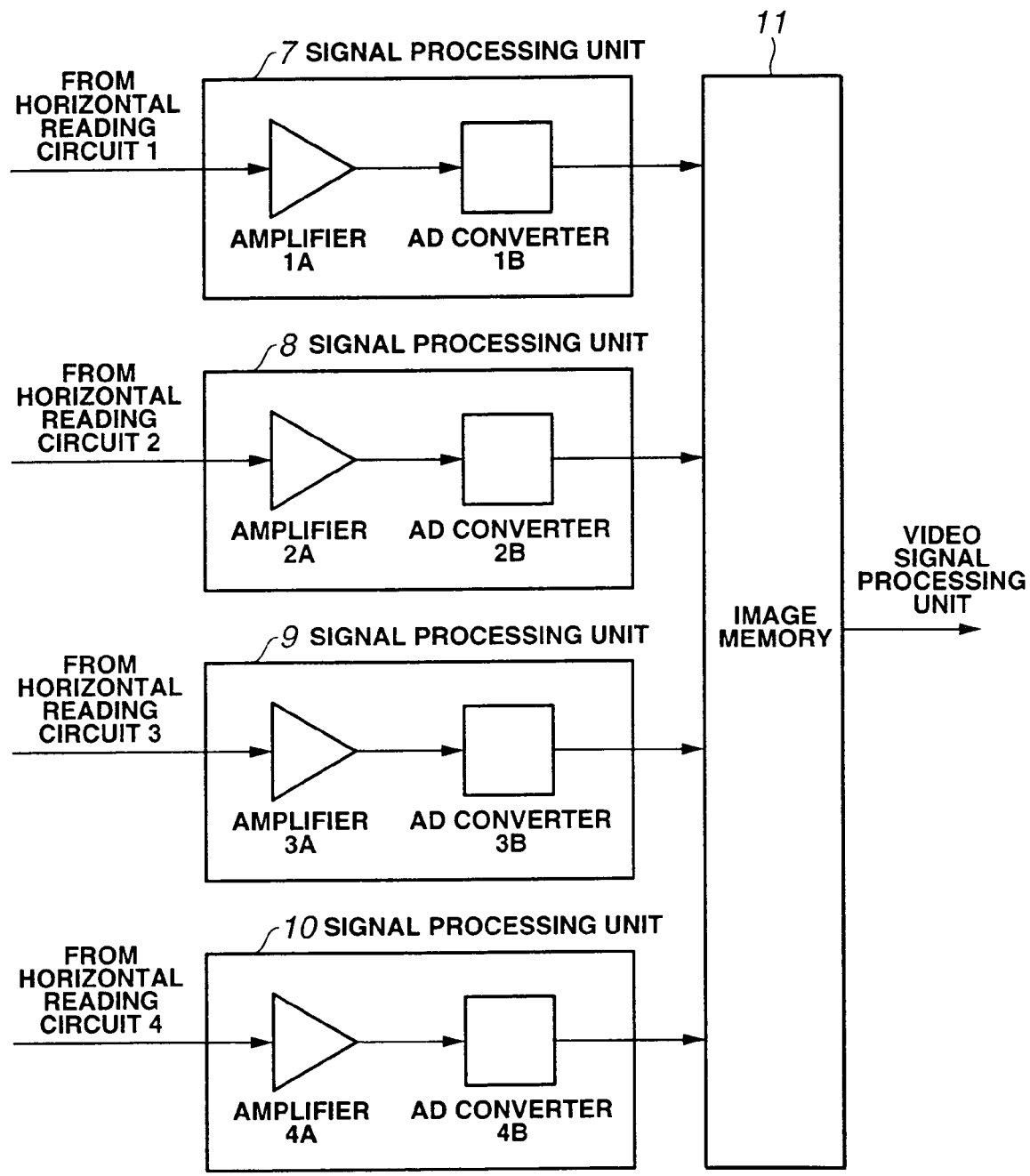
FIG. 2 is a circuit diagram showing an example of the structure of an image pick-up device for processing a plurality of video signal outputs according to the one related art.
Figure 3:
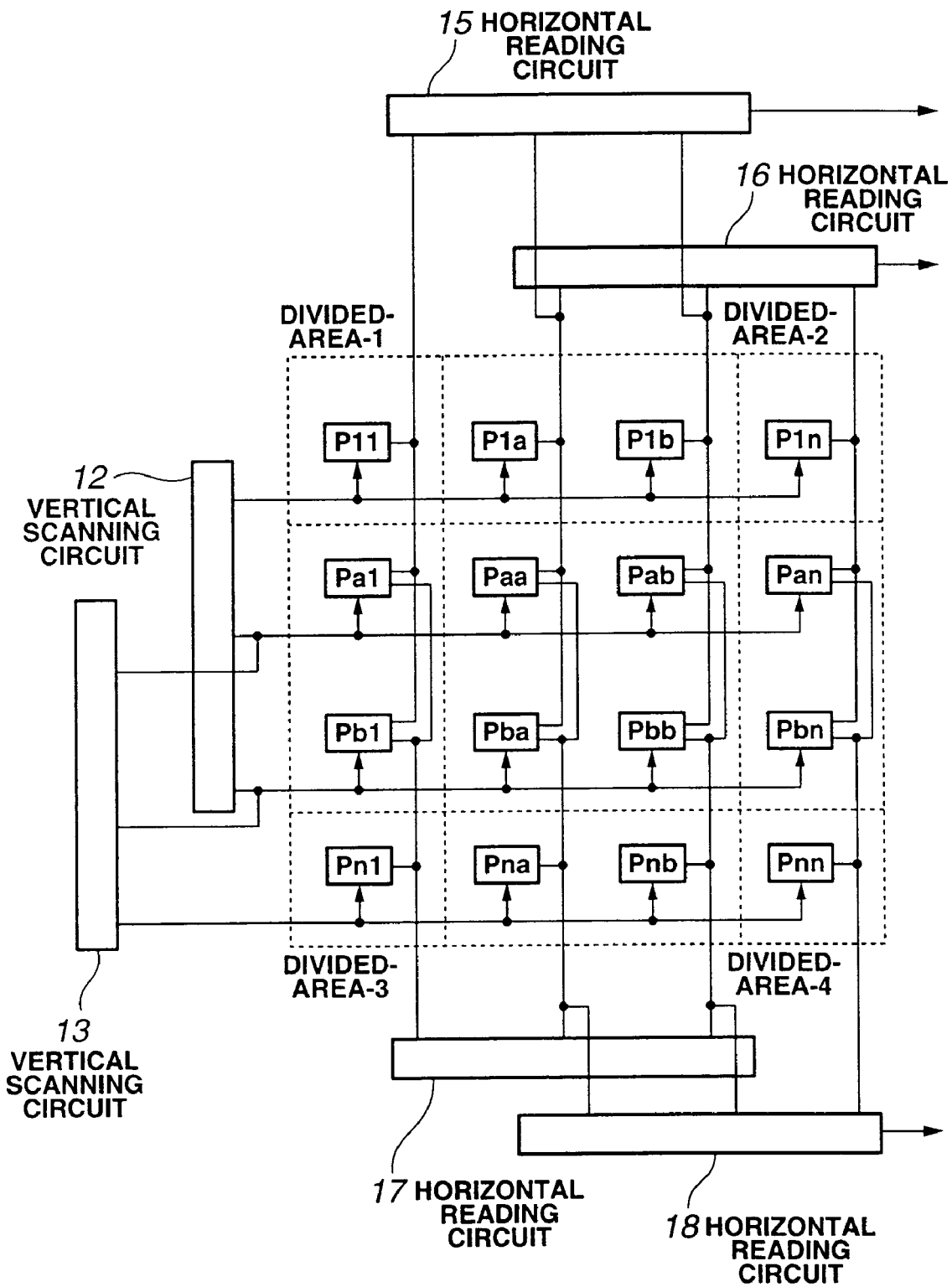
FIG. 3 is an explanatory diagram showing an image pick-up device according to another related art disclosed in the Patent Document 1.
Figure 4:
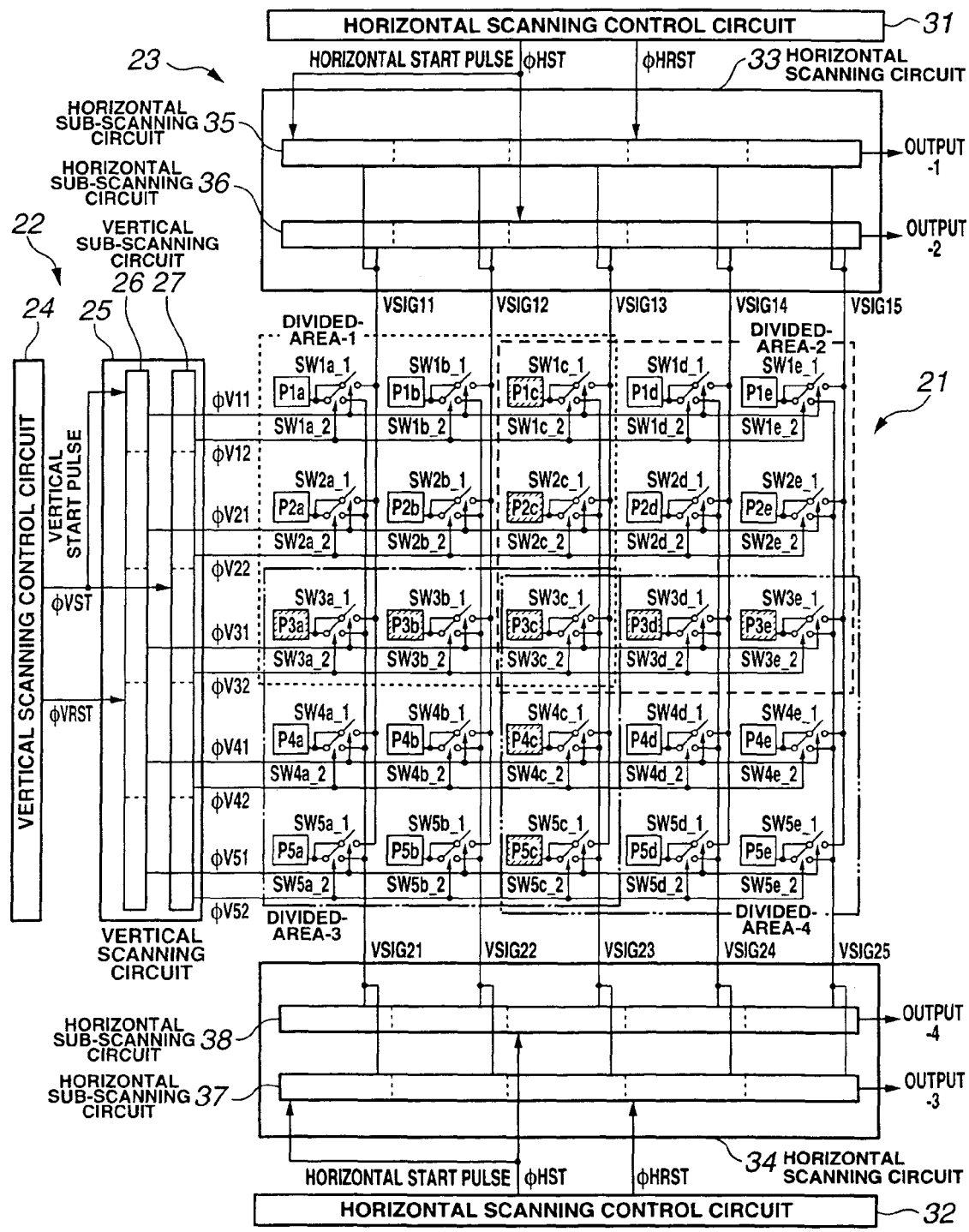
FIG. 4 is an explanatory diagram showing a solid-state image pick-up device according to the first embodiment of the present invention.

Hereinbelow, the embodiments of the present invention will be described with reference to the drawings. FIG. 4 is an explanatory diagram showing a solid-state image pick-up device according to the first embodiment of the present invention.

The solid-state pick-up device shown in FIG. 4 comprises: a pixel area 21, a vertical driving system 22, and a horizontal driving system (including an output system) 23. The vertical driving system 22 comprises: a vertical scanning control circuit 24 and a vertical scanning circuit 25. The horizontal driving system 23 comprises: two horizontal scanning control circuits 31 and 32, two horizontal scanning circuits 33 and 34, and includes four-channel output systems.

A pixel area 21 comprises pixels $P_{1a}$ to $P_{5e}$ arranged in a matrix. Each pixel $P_{uv}$ ($1 \leq u \leq 5$ and $a \leq v \leq e$ in FIG. 4) has a photoelectric converting element Puv and switches $SW_{uv\_1}$ and $SW_{uv\_2}$. The photoelectric converting element Puv stores signals corresponding to incident light. The signals stored in the converting element Puv are respectively outputted via the switches $SW_{uv\_1}$ and $SW_{uv\_2}$ in the pixel. For the purpose of a brief description, referring to FIG. 4, the pixel area 21 comprising (5×5) pixels, which is different from the actual one, is shown. The pixel area 21 is divided into four parts, i.e., divided-area-1 to divided-area-4 containing two areas in the vertical direction and two areas in the horizontal direction. The number of divisions can properly be set.

According to the first embodiment, the respective divided areas which are adjacent in the vertical and horizontal directions include a common pixel. That is, the divided-area-1 has pixels $P_{1a}$ to $P_{3c}$, the divided-area-2 has pixels $P_{1c}$ to $P_{3e}$, the divided-area-3 has pixels $P_{3a}$ to $P_{5c}$, and the divided-area-4 has pixels $P_{3c}$ to $P_{5e}$. Pixels shown by dotted patterns in FIG. 4 correspond to overlapped pixels included in a plurality of the divided areas.

According to the first embodiment, the pixels on the same row are respectively connected to two common row selecting lines $\phi V_{u1}$ and $\phi V_{u2}$. The row selecting lines $\phi V_{u1}$ and $\phi V_{u2}$ supply row selecting signals to the two switches $SW_{uv\_1}$ and $SW_{uv\_2}$ on the u-th row ($1 \leq u \leq 5$ in FIG. 4). The two respective switches $SW_{uv\_1}$ and $SW_{uv\_2}$ are on/off controlled by the row selecting signals transferred respectively by the row selecting lines $\phi V_{u1}$ and $\phi V_{u2}$.

A vertical sub-scanning circuit 26 supplies the row selecting signal to the row selecting line $\phi V_{u1}$. A vertical sub-scanning circuit 27 supplies the row selecting signal to the row selecting line $\phi V_{u2}$. According to the first embodiment, the vertical sub-scanning circuits 26 and 27 have the same structure and have a pulse transfer unit and an output terminal corresponding to the respective rows in the pixel area. The each output terminal of the vertical scanning circuit 26 is connected to the row selecting line $\phi V_{u1}$. Each output terminal of the vertical sub-scanning circuit 27 is connected to the respective row selecting line $\phi V_{u2}$. The vertical scanning control circuit 24 supplies a vertical start pulse $\phi V_{ST}$ and a vertical reset pulse $\phi V_{RST}$ to the vertical sub-scanning circuits 26 and 27 so that the row selecting lines $\phi V_{u1}$ and $\phi V_{u2}$ of the rows selectively supply the row selecting signals.

That is, in the vertical sub-scanning circuits 26 and 27 in the vertical scanning circuit 25 respectively, the vertical start pulse $\phi V_{ST}$ is supplied to the pulse transfer unit on a predetermined row and pulses are sequentially transferred to the pulse transfer unit on the next row at a predetermined clock timing (not shown), and the row selecting signal is outputted from the output corresponding to the row. Further, in the vertical sub-scanning circuits 26 and 27 respectively, the vertical reset pulse $\phi V_{RST}$ is supplied to the pulse transfer unit on a predetermined row so that the row selecting signal is reset at the timing of the vertical reset pulse $\phi V_{RST}$.

According to the first embodiment, the pixels at the same column are connected to two common vertical signal lines $VSIG_{1v}$ and $VSIG_{2v}$ ($1 \leq v \leq 5$). That is, the photoelectrically converting element of the pixel on the v-th column is connected to the vertical signal lines $VSIG_{1v}$ and $VSIG_{2v}$ via the two switches $SW_{uv\_1}$ and $SW_{uv\_2}$. The respective switches SWuv_1 and SW uv_2 are switched on, thereby transmitting the signals stored in the pixels to the connected vertical signal line.

According to the first embodiment, horizontal sub-scanning circuits 35 to 38 in horizontal scanning circuits 33 and 34 have the same structure, and have horizontal reading circuits and input terminals in accordance with the respective columns in the pixel areas. The input terminals of the horizontal sub-scanning circuits 35 and 36 are respectively connected to the vertical signal line $VSIG_{1v}$. The input terminals of the horizontal sub-scanning circuits 37 and 38 are respectively connected to the vertical signal line $VSIG_{2v}$. The horizontal scanning control circuits 31 and 32 respectively supply a horizontal start pulse $\phi H_{ST}$ and a horizontal reset pulse $\phi H_{RST}$ to the horizontal sub-scanning circuits 35 and 36 or 37 and 38, and control the reading of the pixel signals via the vertical signal line.

In the horizontal sub-scanning circuits 35 to 38, the horizontal start pulse $\phi H_{ST}$ is supplied to the horizontal reading circuits on a predetermined column, then, the pulses are sequentially transferred to the horizontal reading circuits at the next stage at a predetermined clock timing (not shown). Furthermore, in the horizontal sub-scanning circuits 35 to 38, the signals are captured via the vertical signal line connected to the input terminal corresponding to the column at a clock period based on the transferred pulses, and signals as outputs 1 to 4 are outputted from the output terminals thereof. Moreover, in the horizontal sub-scanning circuits 35 to 38, the horizontal reset pulse $\phi H_{RST}$ is supplied to the horizontal reading circuits at a predetermined column and the horizontal reading circuits are reset at the timing of the horizontal reset pulse $\phi H_{RST}$.

Therefore, both the vertical sub-scanning circuits 26 and 27 can output the signals from all the pixels $P_{uv}$ in the pixel area 21, and horizontal sub-scanning circuits 35 to 38 can read and output the pixel signals from all the pixels $P_{uv}$ in the pixel area 21.

As mentioned above, according to the first embodiment, the structures of the pixels in the pixel area are the same, and the wiring patterns of the signals in the pixel areas are also the same. The plurality of vertical sub-scanning circuits for driving the pixels have the same structure and the plurality of horizontal sub-scanning circuits for reading the pixels have the same structure.

Figure 5:
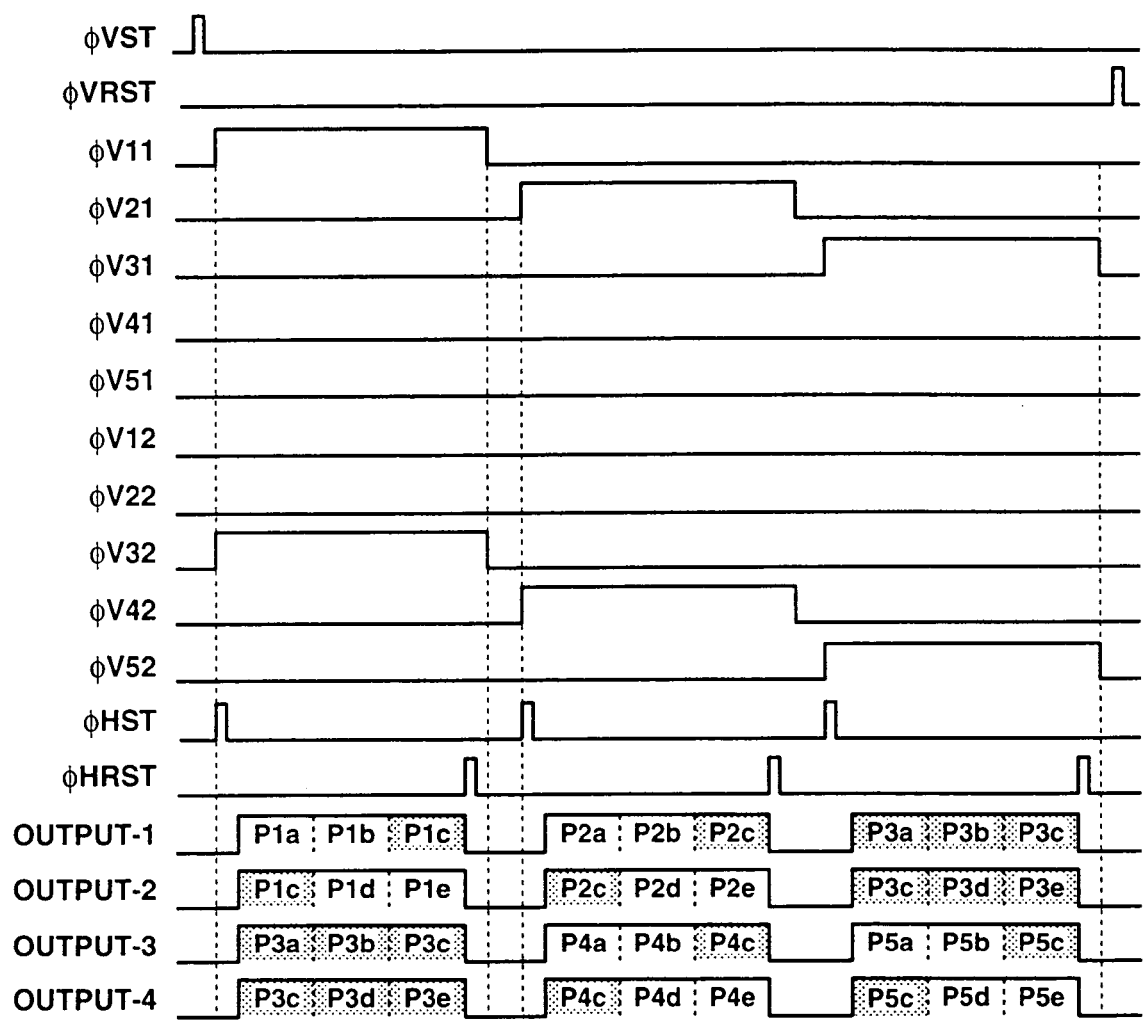
FIG. 5 is a timing chart for explaining the reading operation from pixels according to the first embodiment.

Next, the operation with the above-mentioned structure will be described with reference to FIG. 5 according to the first embodiment. FIG. 5 is a timing chart for explaining the reading operation from the pixels.

The vertical scanning control circuit 24 supplies a vertical start pulse $\phi V_{ST}$ shown in FIG. 5 to the vertical sub-scanning circuits 26 and 27, thereby starting the outputs of the row selecting signal. For example, the vertical start pulse $\phi V_{ST}$ is supplied to the pulse transfer unit on the first row of the vertical sub-scanning circuit 26 and the pulse transfer unit on the third row of the vertical sub-scanning circuit 27. Thus, referring to FIG. 5, high-level (hereinafter, referred to as "H") row selecting signals are generated on row selecting lines $\phi V_{11}$ and $\phi V_{32}$. As a result, all switches $SW_{1v\_1}$ at the pixel $P_{1v}$ on the first row and all switches $SW_{3v\_2}$ at the pixel $P_{3v}$ on the third row are switched on.

In this state, the horizontal scanning control circuits 31 and 32 supply the horizontal start pulse $\phi H_{ST}$ to the horizontal reading circuits on the first columns in the horizontal sub-scanning circuits 35 and 37 and to the horizontal reading circuits on the third columns of the horizontal sub-scanning circuits 36 and 38. The horizontal sub-scanning circuits 35 to 38 sequentially shift the horizontal start pulse $\phi H_{ST}$ to the horizontal reading circuits at the next stages. The respective horizontal reading circuits output, from the output terminal, the signals from the vertical signal lines connected to the input terminals at a predetermined clock timing after inputting the horizontal start pulse $\phi H_{ST}$. In this case, the horizontal sub-scanning circuits 35 to 38 first respectively output signals read from the pixels $P_{1a}$, $P_{1c}$, $P_{3a}$, and $P_{3c}$.

At the next clock timing, the horizontal reading circuits on the second and fourth columns perform the reading operation. In this case, the horizontal sub-scanning circuits 35 to 38 respectively output signals from the pixels $P_{1b}$, $P_{1d}$, $P_{3b}$, and $P_{3d}$. Further, at the next clock timing, the horizontal reading circuits on the third and fifth columns perform the reading operation. In this case, the horizontal sub-scanning circuits 35 to 38 respectively output signals from the pixels $P_{1c}$, $P_{1e}$, $P_{3c}$, and $P_{3e}$. After ending the reading operation of the pixel signals, the horizontal reset pulse $\phi H_{RST}$ is supplied to the horizontal reading circuits on the fourth columns in the horizontal sub-scanning circuits 35 and 37, thereby stopping the pulse transfer and ending the pixel reading.

At the next horizontal scanning period, the pulses are transferred to the pulse transfer units on the second rows of the vertical sub-scanning circuits 26 and 27. The vertical sub-scanning circuits 26 and 27 supply the "H" row selecting signal to row selecting lines $\phi V_{21}$ and $\phi V_{42}$ on the second and fourth rows. In this state, the horizontal start pulse $\phi H_{ST}$ of the "H" row selecting signal is generated and the pixel reading is performed from the first and third columns similarly to the scanning period of the first row. In this case, a reading similar to that on the first row is performed.

Further, a similar reading operation is performed in the horizontal scanning period of the third row. After ending the horizontal scanning period of the third row, the vertical reset pulse $\phi V_{RST}$ is supplied to the pulse transfer unit on the fourth column in the vertical sub-scanning circuit 26, thereby stopping the shift of the row selecting signal and ending the reading of the pixels in one frame.

As shown by the outputs 1 to 4 in FIG. 5, in one frame period, the data is read from the overlapped pixels shown by the dotted patterns every plural times, and other pixels are read only once. In the case of the overlapped pixels, the pixel signals obtained by reading plural times are averaged, thereby preventing the deterioration in image quality at the boundary of the divided areas.

In this case, the pixels have the same structure, the wiring state and connecting state of the row selecting lines $\phi V_{u1}$ and $\phi V_{u2}$ are the same or uniform, the wiring state and connecting state of the vertical signal lines $VSIG_{1v}$ and $VSIG_{2v}$ are the same or uniform, and the structures of the horizontal sub-scanning circuits 35 to 38 are the same or uniform. Therefore, the signals stored in the respective pixels are outputted from the output terminals of the outputs 1 to 4 as the pixel signals having no property difference without being influenced by the difference in signal paths.

As mentioned above, according to the first embodiment, the plurality of pixels have the same structure and have the same wiring state and connecting state of the row selecting lines and the vertical signal lines. Further, the plurality of vertical sub-scanning circuits 26 and 27 for supplying the row selecting signal to the vertical signal lines in the divided areas have the same structure. Further, the respective outputs have no property difference among the signals stored in the pixels without being influenced by the signal paths because of the same structure among the plurality of horizontal sub-scanning circuits 35 to 38 for reading and outputting the pixel signals from the row selecting lines in the divided area. For example, the same-level signal is obtained from the overlapped pixels outputted from a plurality of output terminals.

The selecting order of the vertical signal line and the row selecting line is not limited to those shown in FIG. 5 and, obviously, various reading methods can be applied.

Figure 6:
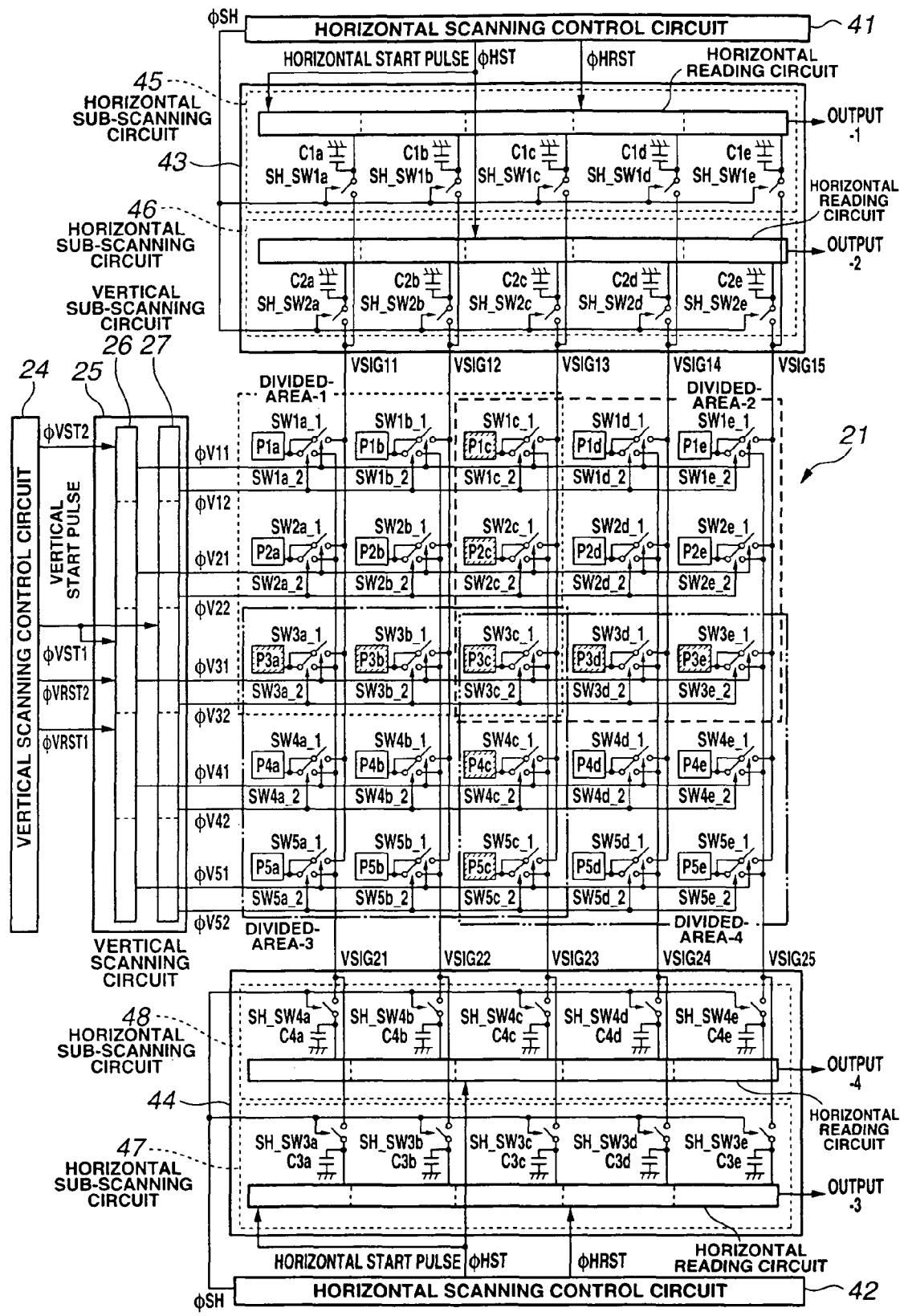
FIG. 6 is an explanatory diagram showing a solid-state image pick-up device according to the second embodiment of the present invention.
Figure 7:
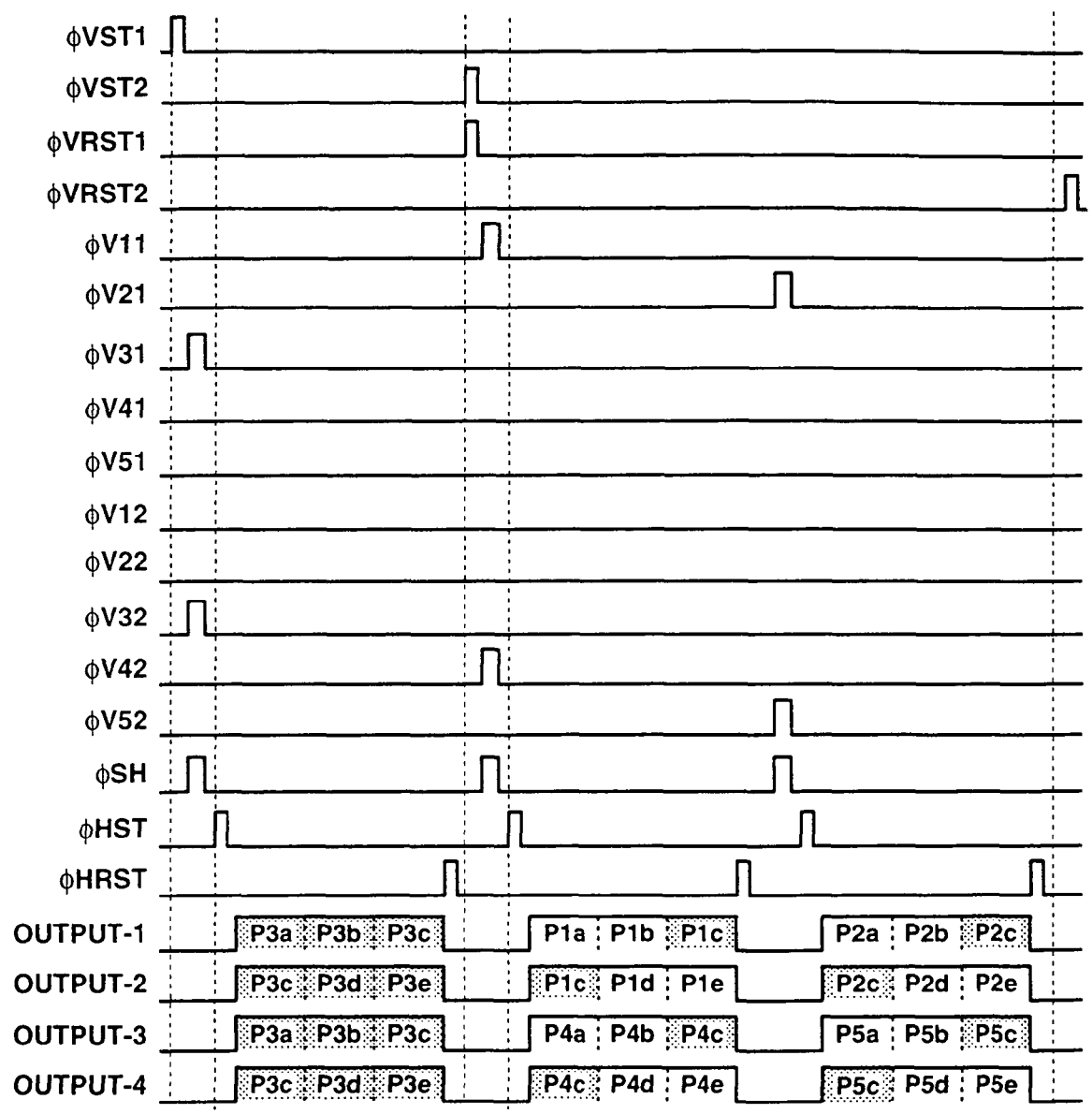
FIG. 7 is a timing chart for explaining the operation of the solid-state pick-up device shown in FIG. 6.

FIGS. 6 and 7 relate to the second embodiment of the present invention. FIG. 6 is an explanatory diagram showing a solid-state pick-up device according to the second embodiment. FIG. 7 is a timing chart for explaining the operation of the solid-state pick-up device shown in FIG. 6. Referring to FIG. 6, the same components are designated by the same reference numerals and a description thereof is omitted.

Unlike the first embodiment, in place of the horizontal scanning control circuits 31 and 32, horizontal scanning control circuits 41 and 42 are used and, in place of the horizontal scanning circuits 33 and 34, horizontal scanning circuits 43 and 44 are used according to the second embodiment. Referring to FIG. 6, the horizontal scanning circuit 43 comprises horizontal sub-scanning circuits comprising horizontal sub-scanning circuits 45 and 46. The horizontal scanning circuit 44 comprises horizontal sub-scanning circuits comprising horizontal sub-scanning circuits 47 and 48.

The horizontal sub-scanning circuits 45 to 48 have the same structure, and comprise: a horizontal reading circuit corresponding to each column in the pixel area 21; and a sample holding circuit between the vertical signal lines $VSIG_{1v}$ and $VSIG_{2v}$. The horizontal scanning control circuits 41 and 42 supply the horizontal start pulse $\phi H_{ST}$ and the horizontal reset pulse $\phi H_{RST}$ to the horizontal sub-scanning circuits 45 to 48, and further supply a sample holding control signal indicating the sample holding timing.

That is, a holding capacitor $C_{1v}$ is arranged between the input terminal of the horizontal reading circuit on the v-th column in the horizontal sub-scanning circuit 45 and the reference potential point. A sampling switch $SH\_SW_{1v}$ is arranged between the vertical signal line $VSIG_{1v}$ and the input terminal of the horizontal reading circuit on the v-th column in the horizontal sub-scanning circuit 45. A holding capacitor $C_{2v}$ is arranged between the input terminal of the horizontal reading circuit on the v-th column in the horizontal sub-scanning circuit 46 and the reference potential point. A sampling switch $SH\_SW_{2v}$ is arranged between the vertical signal line $VSIG_{1v}$ and the input terminal of the horizontal reading circuit on the v-th column in the horizontal sub-scanning circuit 46. A holding capacitor $C_{3v}$ is arranged between the input terminal of the horizontal reading circuit on the v-th column in the horizontal sub-scanning circuit 47 and the reference potential point. A sampling switch $SH\_SW_{3v}$ is arranged between the vertical signal line $VSIG_{2v}$ and the input terminal of the horizontal reading circuit on the v-th column in the horizontal sub-scanning circuit 47. A holding capacitor $C_{4v}$ is arranged between the input terminal of the horizontal reading circuit on the v-th column in the horizontal sub-scanning circuit 48 and the reference potential point. A sampling switch $SH\_SW_{4v}$ is arranged between the vertical signal line $VSIG_{2v}$ and the input terminal of the horizontal reading circuit on the v-th column in the horizontal sub-scanning circuit 48.

Next, the operation with the above structure will be described with reference to FIG. 7 according to the second embodiment. FIG. 7 shows an example of a method for reading the pixel signal according to the second embodiment. According to the second embodiment, the horizontal scanning period is divided into a reading period for supplying and storing the signals from the pixels to the sample holding circuit and an output period for outputting the pixel signals stored in the sample holding circuit.

First, referring to FIG. 7, the vertical scanning control circuit 24 supplies a vertical start pulse $\phi V_{ST1}$ to the pulse transfer units on the third rows of the vertical sub-scanning circuits 26 and 27. The vertical sub-scanning circuit 26 supplies the "H" row selecting signal to a row selecting line $\phi V_{31}$ and the vertical sub-scanning circuit 27 supplies the "H" row selecting signal to a row selecting line $\phi V_{32}$. Thus, both switches $SW_{3v\_1}$ and $SW_{3v\_2}$ of the respective pixels $P_{3v}$ on the third row in the pixel area 21 are switched on, thereby reading the pixels on the third row.

In this case, the pixel signals from the pixels $P_{3a}$ to $P_{3e}$ are supplied to the vertical signal line $VSIG_{1v}$ via switches $SW_{3a\_1}$ and $SW_{3e\_1}$ for selecting the row, and are also supplied to the vertical signal line $VSIG_{2v}$ via switches $SW_{3a\_2}$ and $SW_{3e\_2}$ for selecting the row.

On the basis of a sample holding control signal $\phi SH$, the output signals from the vertical signal lines $VSIG_{1v}$ ($VSIG_{11}$ to $VSIG_{15}$) are stored in holding capacitors $C_{1a}$ to $C_{1e}$ and $C_{2a}$ to $C_{2e}$ via sampling switches $SH\_SW_{1a}$ to $SH\_SW_{1e}$ in the horizontal sub-scanning circuit 45 and sampling switches $SH\_SW_{2a}$ to $SH\_SW_{2e}$ in the horizontal sub-scanning circuit 46. Further, based on the sample holding control signal $\phi SH$, the storage of the output signals from the vertical signal lines $VSIG_{2v}$ ($VSIG_{21}$ to $VSIG_{25}$) are stored into holding capacitors $C_{3a}$ to $C_{3e}$ and $C_{4a}$ to $C_{4e}$ via sampling switches $SH\_SW_{3a}$ to $SH\_SW_{3e}$ in the horizontal sub-scanning circuit 47 and sampling switches $SH\_SW_{4a}$ to $SH\_SW_{4e}$ in the horizontal sub-scanning circuit 48.

As mentioned above, the pixel signals of all the pixels on the third row selected by the vertical sub-scanning circuit 26 are held in the sample holding circuits in the horizontal sub-scanning circuits 45 and 46. The pixel signals of all the pixels on the third row selected by the vertical sub-scanning circuit 27 are held in the sample holding circuits in the horizontal sub-scanning circuits 47 and 48.

Next, all the sampling switches $SH\_SW_{1a}$ to $SH\_SW_{4e}$ are switched off and the electrical connection is shut off between the vertical signal lines $VSIG_{11}$ to $VSIG_{25}$ and the holding capacitors $C_{1a}$ to $C_{4e}$. Next, the horizontal scanning control circuits 41 and 42 supply the horizontal start pulse $\phi H_{ST}$ to the horizontal reading circuits on the first columns of the horizontal sub-scanning circuits 45 and 47 and to the horizontal reading circuits on the third columns of the horizontal sub-scanning circuits 46 and 48. Thus, referring to FIG. 7, the horizontal sub-scanning circuit 45 sequentially outputs the pixel signals of pixels $P_{3a}$ to $P_{3c}$ stored in the holding capacitors $C_{1a}$ to $C_{1c}$ as the output 1. The horizontal sub-scanning circuit 46 sequentially outputs the pixel signals of the pixels $P_{3c}$ to $P_{3e}$ stored in the holding capacitors $C_{2c}$ to $C_{2e}$ as the output 2. The horizontal sub-scanning circuit 47 sequentially outputs the pixel signals of the pixels $P_{3a}$ to $P_{3c}$ stored in the holding capacitors $C_{3a}$ to $C_{3c}$ as the output 3. The horizontal sub-scanning circuit 48 sequentially outputs the pixel signals of the pixels $P_{3c}$ to $P_{3e}$ stored in the holding capacitors $C_{4c}$ to $C_{4e}$ as the output 4.

After reading these pixel signals, the horizontal scanning control circuits 41 and 42 supply the horizontal reset pulse $\phi H_{RST}$ to the fourth horizontal reading circuits in the horizontal sub-scanning circuits 45 and 47. Consequently, the operation of the horizontal sub-scanning circuits 45 and 47 stops and the reading operation of the pixels $P_{3a}$ to $P_{3e}$ ends. In this way it is possible to obtain the signals of the pixels $P_{3a}$ to $P_{3e}$ from the corresponding output terminals of a plurality of output systems.

According to the second embodiment, the horizontal sub-scanning circuits of the four output systems have the same structure and have the same wiring state and connecting state. The pixel signals obtained from the four output systems have no property difference. For example, the wiring state and connecting state are the same in the vertical signal lines $VSIG_{11}$ to $VSIG_{15}$ and in the vertical signal lines $VSIG_{21}$ to $VSIG_{25}$ for reading the signal from the pixel $P_{3c}$. The signals of the pixel $P_{3c}$ obtained from the outputs 1 to 4 are substantially the same.

The output signals from the pixel are temporarily stored in the holding capacitors $C_{1a}$ to $C_{4c}$ in the horizontal sub-scanning circuits 45 to 48. Therefore, in the pixel in which the non-breaking reading operation is impossible, the output signals from the pixel can be read from a plurality of output terminals.

Since the output signals from the pixel are temporarily stored in the holding capacitors $C_{1a}$ to $C_{4e}$, sampling timings of the pixel signals read from the $P_{3a}$ to $P_{3e}$ can match and the duration for photoelectric conversion every pixel match.

At the next horizontal scanning period, the vertical scanning control circuit 24 supplies a vertical reset pulse $\phi V_{RST1}$ to the pulse transfer unit on the fourth row and the vertical sub-scanning circuit 26 prohibits the pulse from being transferred to the pulse transfer unit on the next row. Then, the vertical scanning control circuit 24 supplies a vertical start pulse $\phi V_{ST2}$ to the pulse transfer unit on the first row in the vertical sub-scanning circuit 26. Thus, the vertical sub-scanning circuit 26 supplies the "H" row selecting signal to a row selecting line $\phi V_{11}$ and the vertical sub-scanning circuit 27 supplies the "H" row selecting signal to a row selecting line $\phi V_{42}$.

In this case an operation similar to that for the horizontal scanning period reads the signals from the pixels $P_{1a}$ to $P_{1e}$ and $P_{4a}$ to $P_{4e}$ (refer to FIG. 7). In the next horizontal scanning period, the vertical sub-scanning circuit 26 selects a row selecting line $\phi V_{21}$ and the vertical sub-scanning circuit 27 selects a row selecting line $\phi V_{52}$. A similar operation reads the signals from the pixels $P_{2a}$ to $P_{2e}$ and $P_{5a}$ to $P_{5e}$. After ending the operation for reading the signals from the pixels $P_{1a}$ to $P_{5e}$, the vertical scanning control circuit 24 supplies a vertical reset pulse $\phi VRST2$ to the vertical sub-scanning circuit 26, thereby stopping the operation of the vertical sub-scanning circuit 26.

The pixel signals from the pixels $P_{1c}, P_{2c}, P_{3a}, P_{3b}, P_{3c}, P_{3d}, P_{3e}, P_{4c}$, and $P_{5c}$ shown by the dotted patterns are outputted plural times respectively from the output terminals of the outputs 1 to 4. These pixel signals are averaged, for example, thereby preventing the deterioration in image quality at the boundary. Since the structures of the pixel area 21, the horizontal driving system, the vertical driving system, and the output system are uniform, the pixel signals at the pixels have no property difference and an image with high quality is obtained in accordance with the incident light amount.

According to the second embodiment, the same advantages as those according to the first embodiment are obtained. Further, even the output signals from the pixels in which the non-break reading is impossible can be outputted from a plurality of output terminals by temporarily storing the pixel signals into the holding capacitors $C_{1a}$ to $C_{4e}$ in the horizontal sub-scanning circuits 45 to 48. Furthermore, it is possible to match the sampling timings of the signals from the pixels $P_{3a}$ to $P_{3e}$ to the holding capacitors $C_{1a}$ to $C_{4e}$.

Obviously, the reading order according to the second embodiment can be applied to the first embodiment.

Figure 8:
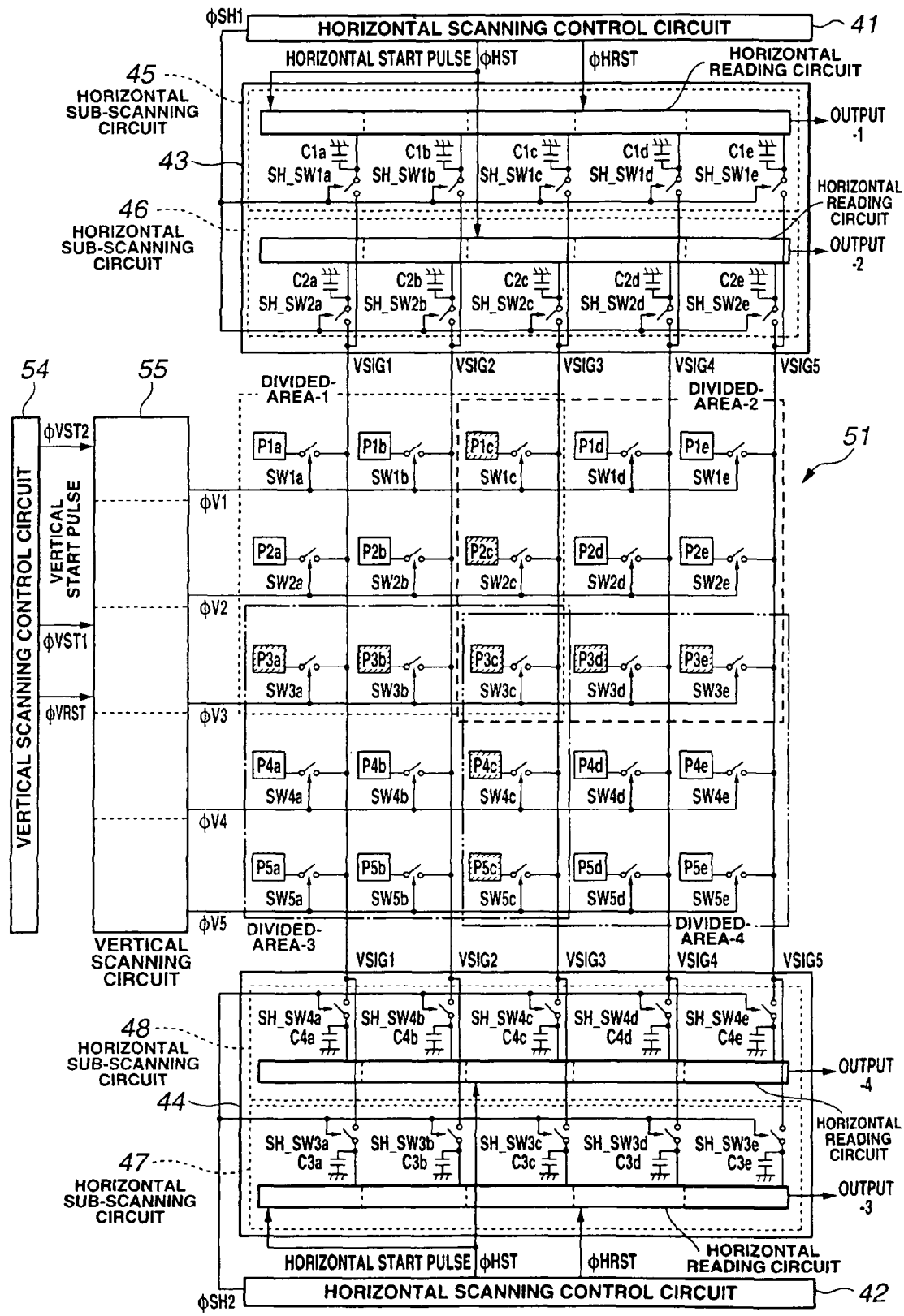
FIG. 8 is an explanatory diagram showing a solid-state pick-up device according to the third embodiment of the present invention.
Figure 9:
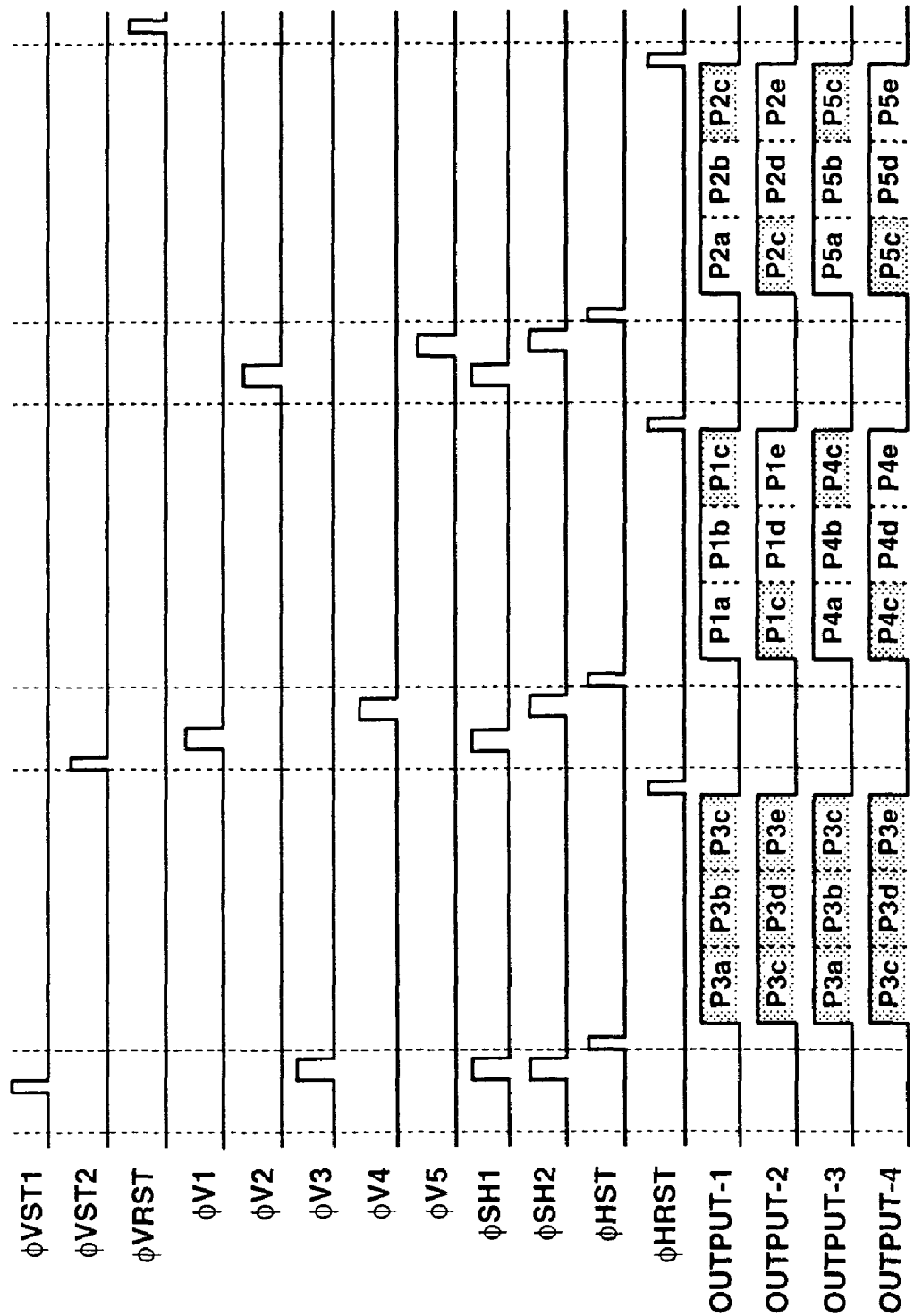
FIG. 9 is a timing chart for explaining the operation of the solid-state pick-up device shown in FIG. 8.

FIGS. 8 and 9 relate to the third embodiment. FIG. 8 is an explanatory diagram showing a solid-state pick-up device according to the third embodiment. FIG. 9 is a timing chart for explaining the operation of the solid-state pick-up device shown in FIG. 8. Referring to FIG. 8, the same components as those shown in FIG. 6 are designated by the same reference numerals and a description thereof is omitted.

The solid-state pick-up device according to the third embodiment has a pixel area and a vertical driving system of which structures are different from those according to the second embodiment. Referring to FIG. 8, a pixel area 51 has pixels $P_{1a}$ to $P_{5e}$ with the matrix arrangement. The respective pixels $P_{uv}$ comprise a photoelectric converting element $P_{uv}$ and a switch $SW_{uv}$. The photoelectric converting element $P_{uv}$ stores signals in accordance with the incident light. The signals stored in the photoelectrically converting element Puv are outputted via the switches SWuv in the pixel. Referring to FIG. 8, for the purpose of a brief description, the pixel area 51 comprising (5×5) pixels which is different from the actual one is shown. The pixel area 51 is divided into four divided-area-1 to divided-area-4 sections containing two areas in the vertical direction and two areas in the horizontal direction. The number of divisions can properly be set.

According to the third embodiment, the divided areas which are adjacent in the vertical and horizontal directions include a common pixel. That is, the divided-area-1 has pixels $P_{1a}$ to $P_{3c}$, the divided-area-2 has pixels $P_{1c}$ to $P_{3e}$, the divided-area-3 has pixels $P_{3a}$ to $P_{5c}$, and the divided-area-4 has pixels $P_{3c}$ to $P_{5e}$. Pixels shown by dotted patterns in FIG. 8 correspond to overlapped pixels included in a plurality of the divided areas.

According to the third embodiment, the pixels on the same row are connected to one common row selecting line $\phi Vu$ ($1 \leq u \leq 5$ in FIG. 6). The row selecting lines $\phi V_u$ supply row selecting signals to the switch $SW_{uv}$ on the u-th row. The switch $SW_{uv}$ is on-off controlled by row selecting signals transferred by the row selecting line $\phi V_u$.

A vertical scanning circuit 55 supplies the row selecting signal to the row selecting line $\phi V_u$. The vertical scanning circuit 55 has the pulse transfer units and output terminals corresponding to the respective rows in the pixel area 51. Each output terminal of the vertical scanning circuit 55 is connected to a row selecting line $\phi V_u$. A vertical scanning control circuit 54 supplies vertical start pulses $\phi V_{ST1}$ and $\phi V_{ST2}$ to the vertical scanning circuit 55 so as to enable to selectively supply the row selecting signal to the row selecting line $\phi V_u$.

That is, in the vertical scanning circuit 55, the vertical start pulses $\phi V_{ST1}$ and $\phi V_{ST2}$ are sequentially supplied to the pulse transfer unit on a predetermined row. The pulses are sequentially transferred to the pulse transfer unit on the next row at a predetermined clock timing (not shown), and are outputted as the row selecting signal from the output terminal corresponding to the row. Further, in the vertical scanning circuit 55, the vertical reset pulse $\phi V_{RST}$ is supplied to the pulse transfer unit on a predetermined row and the row selecting signal is reset at the timing of the vertical reset pulse $\phi V_{RST}$.

According to the third embodiment, the pixels on the same column are connected to a common vertical signal line $VSIGv$ ($1 \leq v \leq 5$). That is, the photoelectric converting element of the pixel on the v-th column is connected to the vertical signal line $VSIG_v$ via the respective switches $SW_{uv}$. The respective switches $SW_{uv}$ are switched on, thereby transmitting the signals stored in the pixels to the connected vertical signal line.

Next, the operation with the above structure will be described with reference to FIG. 9. FIG. 9 shows one example of a method for reading the pixel signal. According to the third embodiment, the horizontal scanning period is divided into a reading period for supplying and storing the signals from the pixels to the sample holding circuit and an output period for outputting the pixel signal stored in the sample holding circuit. Further, according to the reading method shown in FIG. 9, the reading period is divided into two periods of the former half and the latter half and the signals are read in a time division manner for every row.

First, the vertical scanning control circuit 54 supplies vertical start pulses $\phi V_{ST1}$ shown in FIG. 9 to the vertical scanning circuit 55 so as to start the output from the row selecting signal. For example, the vertical start pulses $\phi V_{ST1}$ are supplied to the pulse transfer unit on the third row in the vertical scanning circuit 55. Thus, referring to FIG. 9, the "H" row selecting signal is generated to the row selecting line $\phi V_3$. Consequently, all of the switches $SW_{3v}$ ($SW_{3a}$ to $SW_{3e}$) in the respective pixels $P_{3v}$ on the third row are switched on, thereby reading the respective pixels on the third row. In this case, the pixel signals from the pixels $P_{3a}$ to $P_{3e}$ are supplied to the vertical signal lines $VSIG_1$ to $VSIG_5$ via the switches $SW_{3a}$ to $SW_{3e}$ for selecting the row.

A sample holding control signal $\phi SH_1$ enables the output signal from the vertical signal line $VSIG_v$ ($VSIG_1$ to $VSIG_5$) to be supplied to the holding capacitors $C_{1a}$ to $C_{1e}$ and $C_{2a}$ to $C_{2e}$ via the sampling switches $SH\_SW_{1a}$ to $SH\_SW_{1e}$ in the horizontal sub-scanning circuit 45 and sampling switches $SH\_SW_{2a}$ to $SH\_SW_{2e}$ in the horizontal sub-scanning circuit 46. Further, a sample holding control signal $\phi SH_2$ stores the output signals from the vertical signal lines $VSIG_v$ ($VSIG_1$ to $VSIG_5$) into holding capacitors $C_{3a}$ to $C_{3e}$ and $C_{4a}$ to $C_{4e}$ via sampling switches $SH\_SW_{3a}$ to $SH\_SW_{3e}$ in the horizontal sub-scanning circuit 47 and sampling switches $SH\_SW_{4a}$ to $SH\_SW_{4e}$ in the horizontal sub-scanning circuit 48.

As mentioned above, the pixel signals of all the pixels on the third row selected by the vertical scanning circuit 55 are held in the sample holding circuits of the horizontal sub-scanning circuits 45 and 46. The pixel signals of all the pixels on the third row selected by the vertical scanning circuit 55 are also held in the sample holding circuits of the horizontal sub-scanning circuits 47 and 48.

Next, all the sampling switches $SH\_SW_{1a}$ to $SH\_SW_{4e}$ are switched off and the electrical connection is shut off between the vertical signal lines $VSIG_1$ to $VSIG_5$ and the holding capacitors $C_{1a}$ to $C_{4e}$. Next, the horizontal scanning control circuits 41 and 42 supply the horizontal start pulse $\phi H_{ST}$ to the horizontal reading circuits on the first columns of the horizontal sub-scanning circuits 45 and 47 and the horizontal reading circuits on the third columns of the horizontal sub-scanning circuits 46 and 48. Thus, referring to FIG. 9, the horizontal sub-scanning circuit 45 sequentially outputs the pixel signals of the pixels $P_{3a}$ to $P_{3c}$ stored in the holding capacitors $C_{1a}$ to $C_{1c}$ as the output 1. The horizontal sub-scanning circuit 46 sequentially outputs the pixel signals of the pixels $P_{3c}$ to $P_{3e}$ stored in the holding capacitors $C_{2c}$ to $C_{2e}$ as the output 2. The horizontal sub-scanning circuit 47 sequentially outputs the pixel signals of the pixels $P_{3a}$ to $P_{3c}$ stored in the holding capacitors C3a to C3c as the output 3. The horizontal sub-scanning circuit 48 sequentially outputs the pixel signals of the pixels P3c to $P_{3e}$ stored in the holding capacitors $C_{4c}$ to $C_{4e}$ as the output 4.

After reading the pixel signals (at the end of the output period), the horizontal scanning control circuits 41 and 42 supply a horizontal reset pulse $\phi H_{RST}$ to the fourth horizontal reading circuits in the horizontal sub-scanning circuits 45 and 47. Consequently, the operation of the horizontal sub-scanning circuits 45 and 47 stops and the reading operation of the pixels $P_{3a}$ to $P_{3e}$ ends. It is possible to obtain the signals from the pixels $P_{3a}$ to $P_{3e}$ from the corresponding output terminals of a plurality of output systems.

According to the third embodiment, the four output systems have the same structure of the horizontal sub-scanning circuit, the same wiring state and the same connecting state. The pixel signals obtained from the four output systems have no property difference. The signals from the pixel $P_{3c}$ obtained from the outputs 1 to 4 are the same.

The output signals from the pixel are temporarily stored in the holding capacitors $C_{1a}$ to $C_{4e}$ in the horizontal sub-scanning circuits 45 to 48. Therefore, even in the pixel in which the non-breaking reading operation is impossible, the output signals from the pixel can be read from a plurality of output terminals.

Since the output signals from the pixels are temporarily stored in the holding capacitors $C_{1a}$ to $C_{4e}$, the sampling timings of the pixel signals read from the $P_{3a}$ to $P_{3e}$ can be matched and the duration for photoelectric conversion in every pixel can be matched.

When starting the next horizontal scanning period (in the former half of the horizontal reading period), the vertical scanning control circuit 54 supplies the vertical start pulse $\phi V_{ST2}$ to the pulse transfer unit on the first row in the vertical scanning circuit 55. Thus, the vertical scanning circuit 55 supplies the "H" row selecting signal to the row selecting line $\phi V_1$. Consequently, in the former half of the horizontal reading period, the switches $SW_{1v}$ of the pixels on the first row are switched on, thereby supplying the pixel signal from the pixels to the vertical signal lines $VSIG_1$ and $VSIG_5$.

In the horizontal scanning control circuit 41, on the basis of the sample holding control signal $\phi SH_1$, the output signals from the vertical signal line $VSIG_v$ ($VSIG_1$ to $VSIG_5$) are stored into the holding capacitors $C_{1a}$ to $C_{1e}$ and $C_{2a}$ to $C_{2e}$ via the sampling switches $SH\_SW_{1a}$ to $SH\_SW_{1e}$ of the horizontal sub-scanning circuit 45 and the sampling switches $SH\_SW_{2a}$ to $SH\_SW_{2e}$ of the horizontal sub-scanning circuit 46. Next, the sampling switches $SH\_SW_{1a}$ to $SH\_SW_{2e}$ are switched off and the vertical signal lines $VSIG_v$ ($VSIG_1$ to $VSIG_5$) are separated from the holding capacitors $C_{1a}$ to $C_{2e}$, thereby ending the reading operation of the signals from the pixels $P_{1a}$ to $P_{1e}$.

In the latter half period of the horizontal scanning period, the pulses based on the vertical start pulse $\phi V_{ST1}$ are outputted to the row selecting line $\phi V_4$ as the "H" row selecting signal. Thus, in the latter half period of the reading period in the horizontal scanning period, the switch $SW_{4v}$ in the fourth pixels is switched on, thereby supplying the pixel signals from the pixels to the vertical signal lines $VSIG_1$ to $VSIG_5$.

In the horizontal scanning control circuit 42, on the basis of the sample holding control signal $\phi SH_2$, the output signals from the vertical signal lines $VSIG_1$ to $VSIG_5$ are supplied and stored into the holding capacitors $C_{3a}$ to $C_{3e}$ and $C_{4a}$ to $C_{4e}$ via the sampling switches $SH\_SW_{3a}$ to $SH\_SW_{3e}$ in the horizontal sub-scanning circuit 47 and the sampling switches $SH\_SW_{4a}$ to $SH\_SW_{4e}$ in the horizontal sub-scanning circuit 48. Next, the sampling switches $SH\_SW_{3a}$ to $SH\_SW_{4e}$ are switched off and the vertical signal lines $VSIG_1$ to $VSIG_5$ are separated from the holding capacitors $C_{3a}$ to $C_{4e}$, thereby ending the reading operation of the signals from the pixels $P_{4a}$ to $P_{4e}$.

As mentioned above, at the reading period in the horizontal scanning period, the pixel signals at all of the pixels at the first and fourth rows are stored in the holding capacitors $C_{1a}$ to $C_{4e}$.

Next, at the start timing of the output period in the horizontal scanning period, the horizontal scanning control circuits 41 and 42 supply the horizontal start pulse $\phi H_{ST}$ to the horizontal reading circuits at the first columns in the horizontal sub-scanning circuits 45 and 47 and the horizontal reading circuits at the third columns in the horizontal sub-scanning circuits 46 and 48. Thus, referring to FIG. 9, the horizontal sub-scanning circuit 45 sequentially outputs the pixel signals of the pixels $P_{1a}$ and $P_{1c}$ stored in the holding capacitors $C_{1a}$ to $C_{1c}$ as the output 1. The horizontal sub-scanning circuit 46 sequentially outputs the pixel signals of the pixels $P_{1c}$ and $P_{1e}$ stored in the holding capacitors $C_{2c}$ to $C_{2e}$ as the output 2. The horizontal sub-scanning circuit 47 sequentially outputs the pixel signals of the pixels $P_{4a}$ to $P_{4c}$ stored in the holding capacitors $C_{3a}$ to $C_{3c}$ as the output 3. The horizontal sub-scanning circuit 48 sequentially outputs the pixel signals of the pixels $P_{4c}$ to $P_{4e}$ stored in the holding capacitors $C_{4c}$ to $C_{4e}$ as the output 4.

After reading the these pixel signals (at the end of the output period), the horizontal scanning control circuits 41 and 42 supply the horizontal reset pulse $\phi H_{RST}$ to the fourth horizontal reading circuits in the horizontal sub-scanning circuits 45 and 47. Consequently, the operation of the horizontal sub-scanning circuits 45 and 47 stops and the reading operation of the pixels $P_{1a}$ to $P_{1e}$ and $P_{4a}$ to $P_{4e}$ ends. It is possible to obtain the signals from the pixels $P_{1a}$ to $P_{1e}$ and $P_{4a}$ to $P_{4e}$ from the output terminals of a plurality of output systems.

In the next horizontal scanning period, the pixels on the second and fifth rows are selected and are read and outputted as mentioned above. Thus, in the horizontal scanning period, the signals from the pixels $P_{2a}$ to $P_{2e}$ and $P_{5a}$ to $P_{5e}$ are outputted from the output terminals of four output systems.

After ending the reading of the pixels $P_{1a}$ to $P_{5e}$, the vertical scanning control circuit 54 supplies the vertical reset pulse $\phi V_{RST}$ to the vertical scanning circuit 55. Thus, the operation of the vertical scanning circuit 55 stops and the row selection ends.

As mentioned above, in the case of the reading method shown in FIG. 9, it is possible to read a plurality of times the signals from the overlapped pixels $P_{1c}$, $P_{2c}$, $P_{3a}$, $P_{3b}$, $P_{3c}$, $P_{3d}$, $P_{3e}$, $P_{4c}$, and $P_{5c}$ shown by dotted patterns, and to suppress the deterioration in image quality at the boundary portion in the divided area by processing such as obtaining the average.

As mentioned above, according to the third embodiment, the pixels in a pixel area have the same structure, the plurality of pixels have the same wiring state and connecting state of the row selecting line and the vertical signal line. Further, the horizontal sub-scanning circuits for reading and outputting the pixel signals of the row selecting lines in the divided areas have the same structure. Therefore, the outputs have no property difference in accordance with the signals stored in the pixels without any influence from the signal path. For example, the same-level signal is obtained from the overlapped pixels outputted from a plurality of output terminals. In addition, the row selecting line and the vertical signal line for driving the pixels forming the pixel area share a single, common system, respectively, and the circuit can be simplified by arranging in each pixel only the single system switches for selecting the row.

Figure 10:
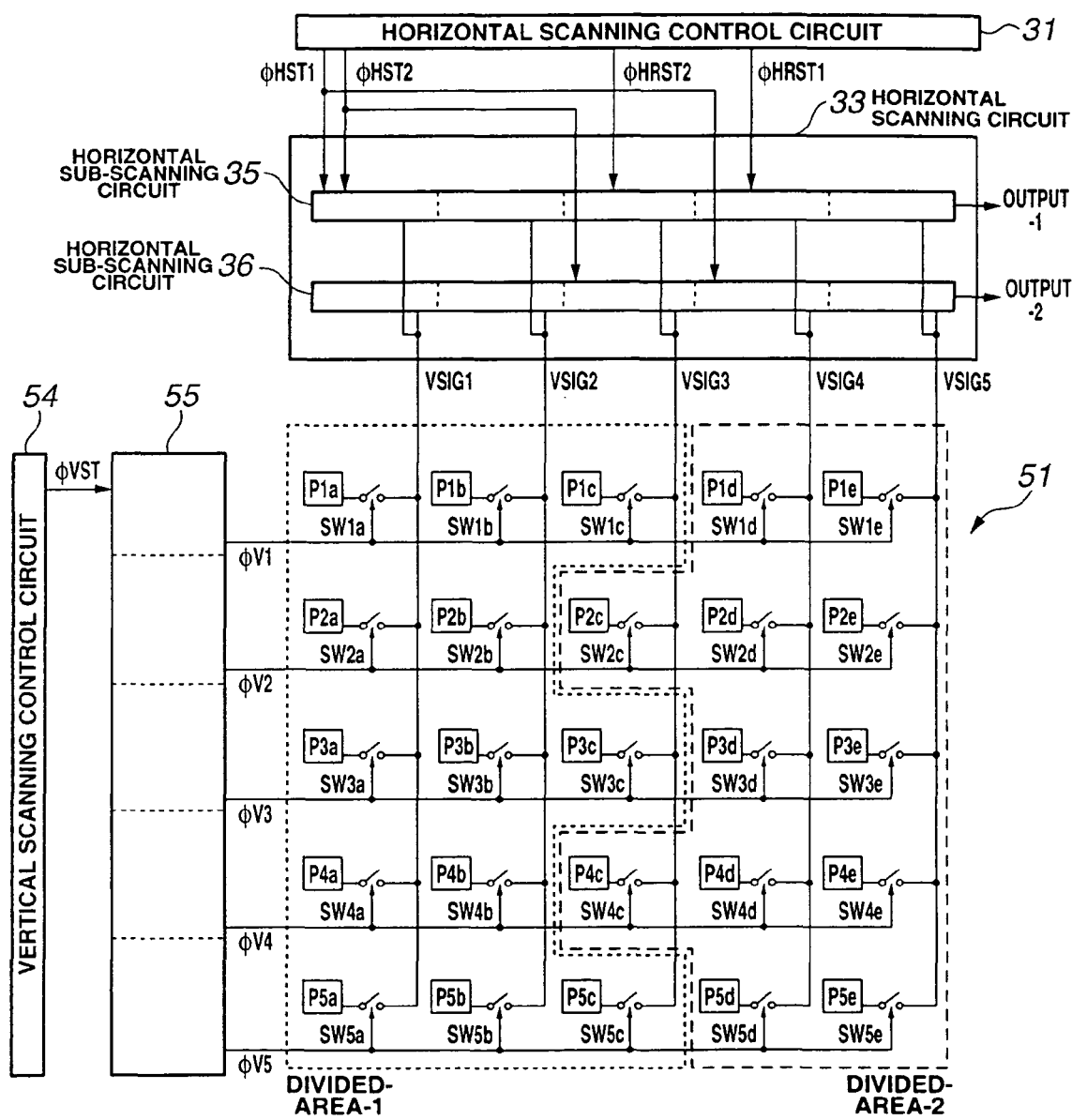
FIG. 10 is an explanatory diagram showing a solid-state pick-up device according to the fourth embodiment of the present invention.
Figure 11:
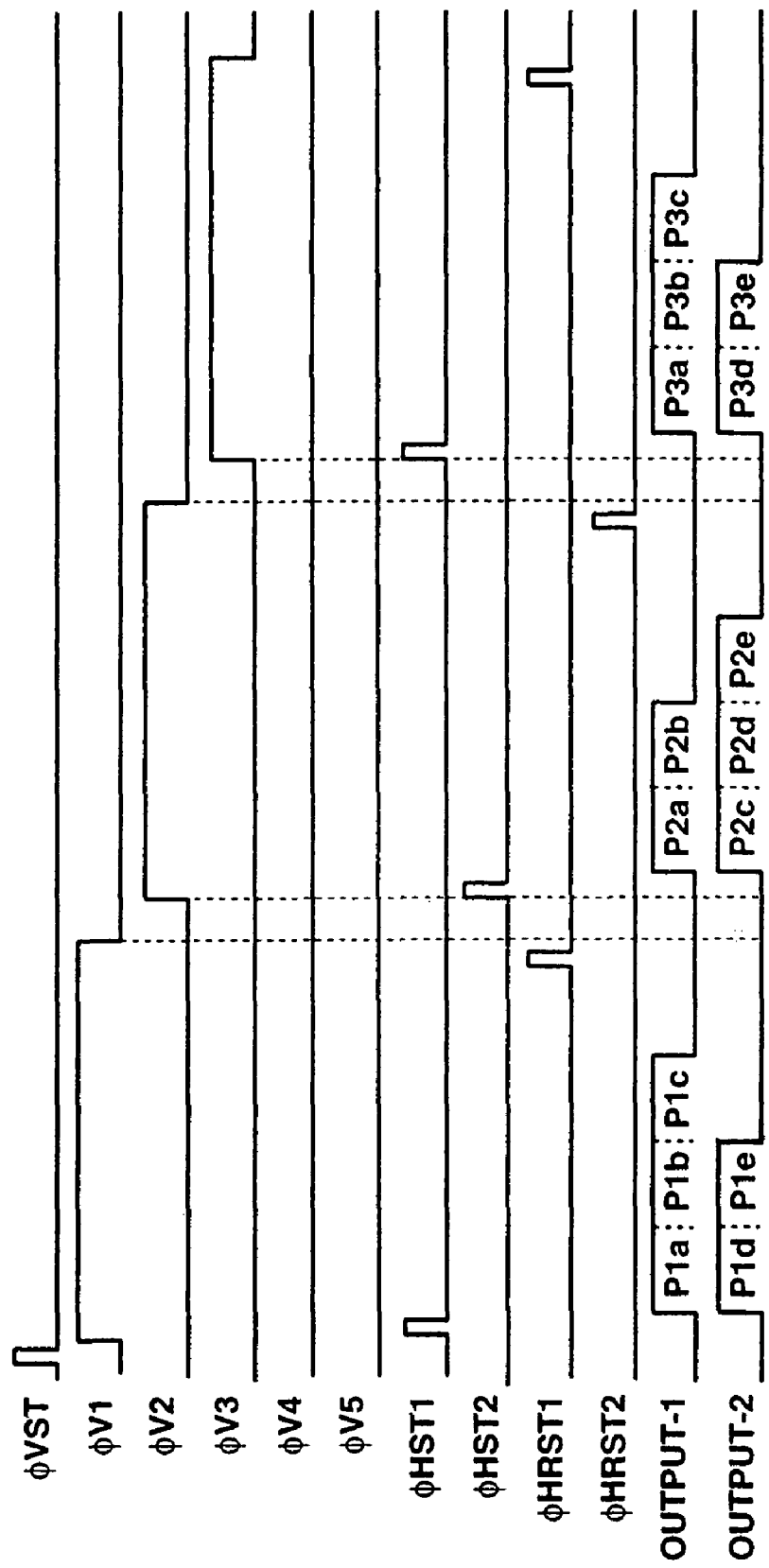
FIG. 11 is a timing chart for explaining the operation of the solid-state pick-up device shown in FIG. 10.

FIGS. 10 and 11 relate to the fourth embodiment. FIG. 10 is an explanatory diagram showing a solid-state pick-up device according to the fourth embodiment. FIG. 11 is a timing chart for explaining the operation of the solid-state pick-up device shown in FIG. 10. Referring to FIG. 10, the same components as those shown in FIGS. 4 and 8 are designated by the same reference numerals and a description thereof is omitted.

Referring to FIG. 10, the solid-state pick-up device according to the fourth embodiment comprises the pixel area 51, the vertical scanning control circuit 54, the vertical scanning circuit 55, the horizontal scanning control circuit 31, and the horizontal scanning circuit 33.

According to the fourth embodiment, the dividing method of the pixel area 51 is different from those according to the first and third embodiments, and the pixel area 51 is divided into divided-area-1 and divided-area-2. The divided-area-1 includes the pixels $P_{1a}$ to $P_{5b}$ and the pixels $P_{1c}$, $P_{3c}$, and $P_{5c}$. The divided-area-2 includes the pixels $P_{1d}$ to $P_{5e}$ and the pixels $P_{2c}$ and $P_{4c}$. That is, as shown by a broken line in FIG. 10, the divided-area-1 and divided-area-2 have a zigzag area in the horizontal direction.

Next, the operation according to the fourth embodiment with the above structure will be described with reference to FIG. 11. FIG. 11 shows one example of the method for reading the pixel signal.

First, the vertical scanning control circuit 54 supplies the vertical start pulse $\phi V_{ST}$ shown in FIG. 11 to the vertical scanning circuit 55, thereby starting the output of the row selecting signal. For example, the vertical start pulse $\phi V_{ST}$ is supplied to the pulse transfer unit on the first row in the vertical scanning circuit 55. Thus, referring to FIG. 11, first, the "H" row selecting signal is generated to the row selecting line $\phi V_1$. All the switches $SW_{1v}$ ($SW_{1a}$ to $SW_{1e}$) in the pixels $P_{1v}$ on the first row are switched on, thereby enabling the reading of the pixels on the first row. In this case, the pixel signals from the pixels $P_{1a}$ to $P_{1e}$ are supplied to the vertical signal lines $VSIG_1$ to $VSIG_5$ via the switches $SW_{1a}$ to $SW_{1e}$ for selecting the row.

The horizontal scanning control circuit 31 generates a horizontal start pulse $\phi H_{ST1}$ shown in FIG. 11 and supplies the generated signals to the horizontal reading circuits on the first column in the horizontal sub-scanning circuit 35 and the horizontal reading circuit on the fourth column in the horizontal sub-scanning circuit 36.

Thus, horizontal sub-scanning circuit 35 sequentially outputs the output signals from the vertical signal lines $VSIG_1$ to $VSIG_3$ as the output 1. The horizontal sub-scanning circuit 36 sequentially outputs the output signals from the vertical signal lines $VSIG_4$ to $VSIG_5$ as the output 2 (refer to FIG. 11).

After reading the necessary pixel signals, the horizontal scanning control circuit 31 supplies the horizontal reset pulse $\phi H_{RST}$ to the horizontal sub-scanning circuit 35. Thus, the operation of the horizontal sub-scanning circuit 35 stops and the reading of the pixels $P_{1a}$ to $P_{1e}$ ends.

Next, the vertical scanning circuit 55 selects the row selecting line $\phi V_2$, thereby supplying the pixel signals from the $P_{2a}$ to $P_{2e}$ to the vertical signal lines $VSIG_1$ to $VSIG_5$ via the row selecting switches $SW_{2a}$ to $SW_{2e}$.

The horizontal scanning control circuit 31 supplies the horizontal start pulse $\phi H_{ST2}$ to the horizontal reading circuits at the first column in the horizontal sub-scanning circuit 35 and to the horizontal reading circuit at the third column in the horizontal sub-scanning circuit 36. Thus, the horizontal sub-scanning circuit 35 sequentially outputs the pixel signals $P_{2a}$ to $P_{2b}$ as the output 1, and the horizontal sub-scanning circuit 36 sequentially outputs the pixel signals $P_{2c}$ to $P_{2e}$ as the output 2.

After reading the necessary pixel signals, the horizontal scanning control circuit 31 supplies a horizontal reset pulse $\phi H_{RST2}$ to the horizontal sub-scanning circuit 35. Thus, the operation of the horizontal sub-scanning circuit 35 stops and the reading of the pixels $P_{2a}$ to $P_{2e}$ ends.

Then, similarly, the vertical scanning circuit 55 sequentially selects the row selecting lines $\phi V_3$ to $\phi V_5$ thereby sequentially reading and outputting the signals of the pixels $P_{3a}$ to $P_{5e}$ by the horizontal sub-scanning circuits 35 and 36.

As mentioned above, according to the fourth embodiment, similarly to the first to third embodiments, the pixel areas have the same structure, the wirings have the same structure, the structures of the vertical and horizontal driving systems and output system and the like are unified, respectively. The pixel signal from the pixels can be outputted from the two-system output system without property difference.

The boundary of the divided areas in the horizontal direction can be made a non-straight line by controlling, by the horizontal scanning control circuit 31, the start position of the horizontal start pulse $\phi H_{ST1}$ and $\phi H_{ST2}$. Thus, it is possible to obtain the video image in which the variation in properties in the pixel areas at the boundary portions is visually suppressed.

Figure 12:
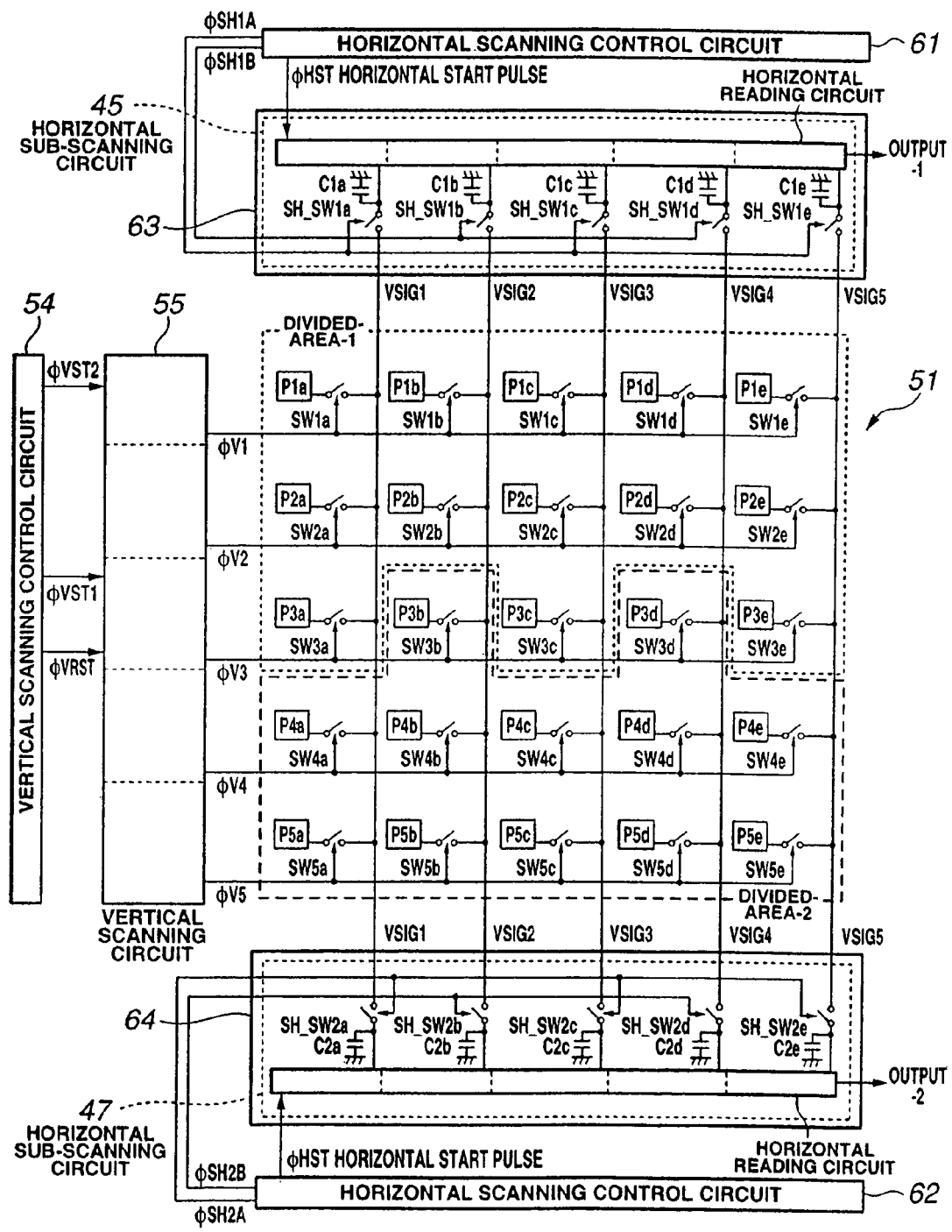
FIG. 12 is an explanatory diagram showing a solid-state pick-up device according to the fifth embodiment of the present invention.
Figure 13:
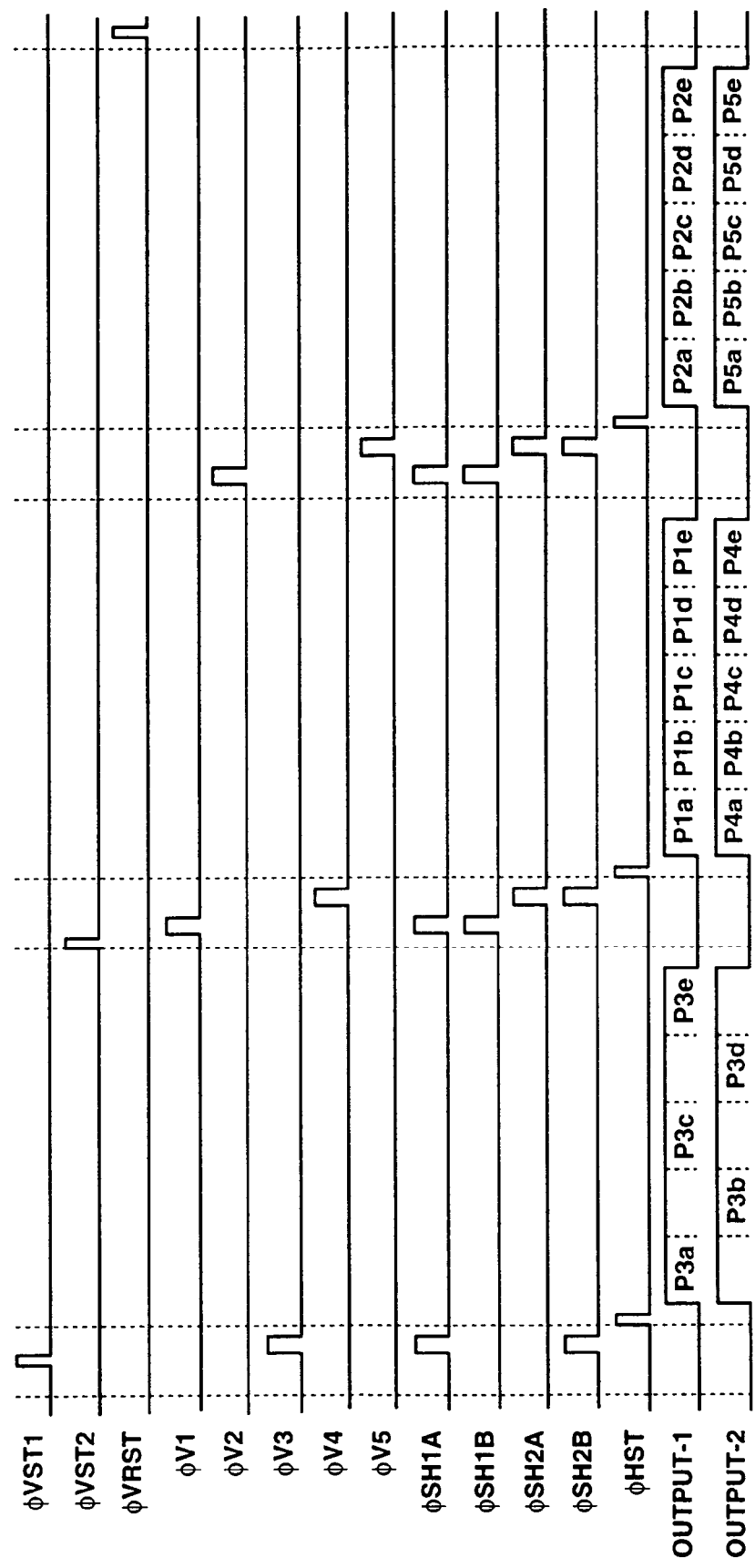
FIG. 13 is a timing chart for explaining the operation of the solid-state pick-up device shown in FIG. 12.

FIGS. 12 and 13 relate to the fifth embodiment. FIG. 12 is an explanatory diagram showing a solid-state pick-up device according to the fifth embodiment. FIG. 13 is a timing chart for explaining the operation of the solid-state pick-up device shown in FIG. 12. Referring to FIG. 12, the same components as those shown in FIGS. 8 and 10 are designated by the same reference numerals and a description thereof is omitted.

Referring to FIG. 12, the solid-state pick-up device according to the fifth embodiment comprises the horizontal scanning control circuit 31 and the horizontal scanning circuit 33.

According to the fifth embodiment, the pixel area 51 is divided into the divided-area-1 and divided-area-2 in the vertical direction. The divided-area-1 includes the pixels $P_{1a}$ to $P_{2e}$ and the pixels $P_{3a}$, $P_{3c}$, and $P_{3e}$. The divided-area-2 includes the pixels $P_{4a}$ to $P_{5e}$ and the pixels $P_{3b}$ and $P_{3d}$. That is, as shown by a broken line in FIG. 12, the divided-area-1 and divided-area-2 have a zigzag mixed area in the vertical direction and the pixel area 51 is divided into two areas in the vertical direction.

According to the fifth embodiment, in place of the horizontal scanning control circuit 31, horizontal scanning control circuits 61 and 62 are used. In place of the horizontal scanning circuit 33, horizontal scanning circuits 63 and 64 are used. Referring to FIG. 12, the horizontal scanning circuit 63 comprises a one-system horizontal sub-scanning circuit 45, and the horizontal scanning circuit 64 comprises a one-system horizontal sub-scanning circuit 47.

The structures of the horizontal sub-scanning circuits 45 and 47 and the structure of sample holding circuits arranged between the horizontal sub-scanning circuits 45 and 47 as the horizontal sub-scanning circuits and the vertical signal lines $VSIG_1$ to $VSIG_5$ are the same as those in FIG. 8.

Next, the operation with the above structure will be described with reference to FIG. 13. FIG. 13 shows one example of the method for reading the pixel signal.

First, the vertical scanning control circuit 54 supplies the vertical start pulses $\phi V_{ST1}$ shown in FIG. 13 to the vertical scanning circuit 55 so as to start the output from the row selecting signal. For example, the vertical start pulses $\phi V_{ST}$ is supplied to the pulse transfer unit at the third row in the vertical scanning circuit 55. Thus, referring to FIG. 13, the "H" row selecting signal is generated at the row selecting line $\phi V_3$. Consequently, all of the switches $SW_{3v}$ ($SW_{3a}$ to $SW_{3e}$) at the pixels $P_{3v}$ at the third row are switched on, thereby enabling the reading of the pixels at the third row. In this case, the pixels signal from the pixels $P_{3a}$ to $P_{3e}$ are supplied to the vertical signal lines $VSIG_1$ to $VSIG_5$.

The horizontal scanning control circuit 61 generates a sample holding control signal $\phi SH_{1A}$ shown in FIG. 13. The sample holding control signal $\phi SH_{1A}$ is supplied to the horizontal reading circuits on the odd columns (first, third, and fifth columns) in the horizontal sub-scanning circuit 45. Thus, the output signals from the vertical signal line $VSIG_1$, $VSIG_3$, and $VSIG_5$ are stored into the respective holding capacitors $C_{1a}$, $C_{1c}$, and $C_{1e}$ via the corresponding sampling switches $SH\_SW_{1a}$, $SH\_SW_{1c}$, and $SH\_SW_{1e}$ in the horizontal sub-scanning circuit 45.

On the other hand, the horizontal scanning control circuit 62 generates a sample holding control signal $\phi SH_{2B}$ shown in FIG. 13. The sample holding control signal $\phi SH_{2B}$ is supplied to the horizontal reading circuits on the even columns (second and fourth columns) in the horizontal sub-scanning circuit 45. Thus, the respective output signals from the vertical signal line $VSIG_2$ and $VSIG_4$ are stored into the holding capacitors $C_{2b}$ and $C_{2d}$ via the corresponding sampling switches $SH\_SW_{2b}$ and $SH\_SW_{2d}$ in the horizontal sub-scanning circuit 47.

Next, all the sampling switches $SH\_SW_{1a}$ to $SH\_SW_{2e}$ are switched off and the connection is shut off between the vertical signal lines $VSIG_1$ to $VSIG_5$ and the holding capacitors $C_{1a}$ to $C_{1e}$. Next, the horizontal scanning control circuits 61 and 62 supply the horizontal start pulse $\phi H_{ST}$ to the first columns of the horizontal sub-scanning circuits 45 and 47. Thus, the horizontal sub-scanning circuit 45 sequentially outputs the pixel signals of the pixels $P_{3a}$, $P_{3c}$ and $P_{3e}$ stored in the holding capacitors $C_{1a}$, $C_{1c}$, and $C_{1e}$ as the output. The horizontal sub-scanning circuit 47 sequentially outputs the pixel signals of the pixels $P_{3b}$ and $P_{3d}$ stored in the holding capacitors $C_{2b}$ and $C_{2d}$ as the output 2.

Next, the vertical scanning control circuit 54 supplies the vertical start pulse $\phi V_{ST2}$ to the pulse transfer unit on the first row in the vertical scanning circuit 55, thereby selecting the row selecting line $\phi V_1$. The signals from the pixels $P_{1a}$ to $P_{1e}$ are supplied to the vertical signal lines $VSIG_1$ to $VSIG_5$ via the switches $SW_{1a}$ to $SW_{1e}$ for selecting the row.

The horizontal scanning control circuit 61 stores, by the sample holding control signal $\phi SH_{1A}$ and $\phi SH_{1B}$, the output signals of the vertical signal lines $VSIG_1$ to $VSIG_5$ in the holding capacitors $C_{1a}$ to $C_{1e}$ via the corresponding sampling switches $SW\_SW_{1a}$ to $SW\_SW_{1e}$ in the horizontal sub-scanning circuit 45.

Next, the horizontal scanning control circuit 61 switches off the sampling switches $SW\_SW_{1a}$ to $SW\_SW_{1e}$ and separates the vertical signal lines $VSIG_1$ to $VSIG_5$ from the holding capacitors $C_{1a}$ to $C_{1e}$, thereby ending the reading operation of the pixels $P_{1a}$ to $P_{1e}$.

Next, the vertical scanning circuit 55 selects the row selecting line $\phi V_4$, thereby supplying the pixel signals $P_{4a}$ to $P_{4e}$ to the vertical signal lines $VSIG_1$ to $VSIG_5$ via the switches $SW_{4a}$ to $SW_{4e}$ for selecting the row. The horizontal scanning control circuit 62 stores, by sample holding control signal $\phi SH_{2A}$ and $\phi SH_{2B}$, the output signals of the vertical signal lines $VSIG_1$ to $VSIG_5$ in the holding capacitors $C_{2a}$ to $C_{2e}$ via the corresponding sampling switches $SW\_SW_{2a}$ to $SW\_SW_{2e}$ in the horizontal sub-scanning circuit 46.

Next, the horizontal scanning control circuit 62 switches off the sampling switches $SW\_SW_{2a}$ to $SW\_SW_{2e}$ and separates the vertical signal lines $VSIG_1$ to $VSIG_5$ from the holding capacitors $C_{2a}$ and $C_{2e}$. Then, the horizontal scanning control circuits 61 and 62 supply the horizontal start pulse $\phi H_{ST}$ to the first column in the horizontal sub-scanning circuits 45 and 47. Thus, the pixel signals $P_{1a}$ to $P_{1e}$ stored in the holding capacitors $C_{1a}$ to $C_{1e}$ are outputted as the outputs 1 of the horizontal sub-scanning circuit 45. The pixel signals $P_{4a}$ to $P_{4e}$ stored in the holding capacitors $C_{2a}$ to $C_{2e}$ are outputted as the outputs 2 of the horizontal sub-scanning circuit 45.

After that, by the similar operation, the signals from the pixels $P_{2a}$ to $P2e$ and $P_{5a}$ to $P_{5e}$ are read. After ending the reading operation from the pixels $P_{1a}$ to $P_{5e}$, the horizontal scanning control circuit 54 supplies the vertical reset pulses $\phi V_{RST}$ to the vertical scanning circuit 55 and the operation of the vertical scanning circuit 55 stops, thereby ending the row selection.

As mentioned above, according to the fifth embodiment, the same advantages as those according to the third embodiment with reference to FIG. 8 are obtained. Further, the horizontal scanning control circuits 61 and 62 respectively control the columns for supplying the sample holding control signal $\phi SH_{1A}$ to $\phi SH_{2B}$ applied to the horizontal sub-scanning circuits 45 and 47, thereby setting the divided areas in the vertical direction to be a non-straight line. As a consequence, it is possible to obtain the image in which the variation in properties in the divided areas at the boundary portion is visually suppressed.

Figure 14:
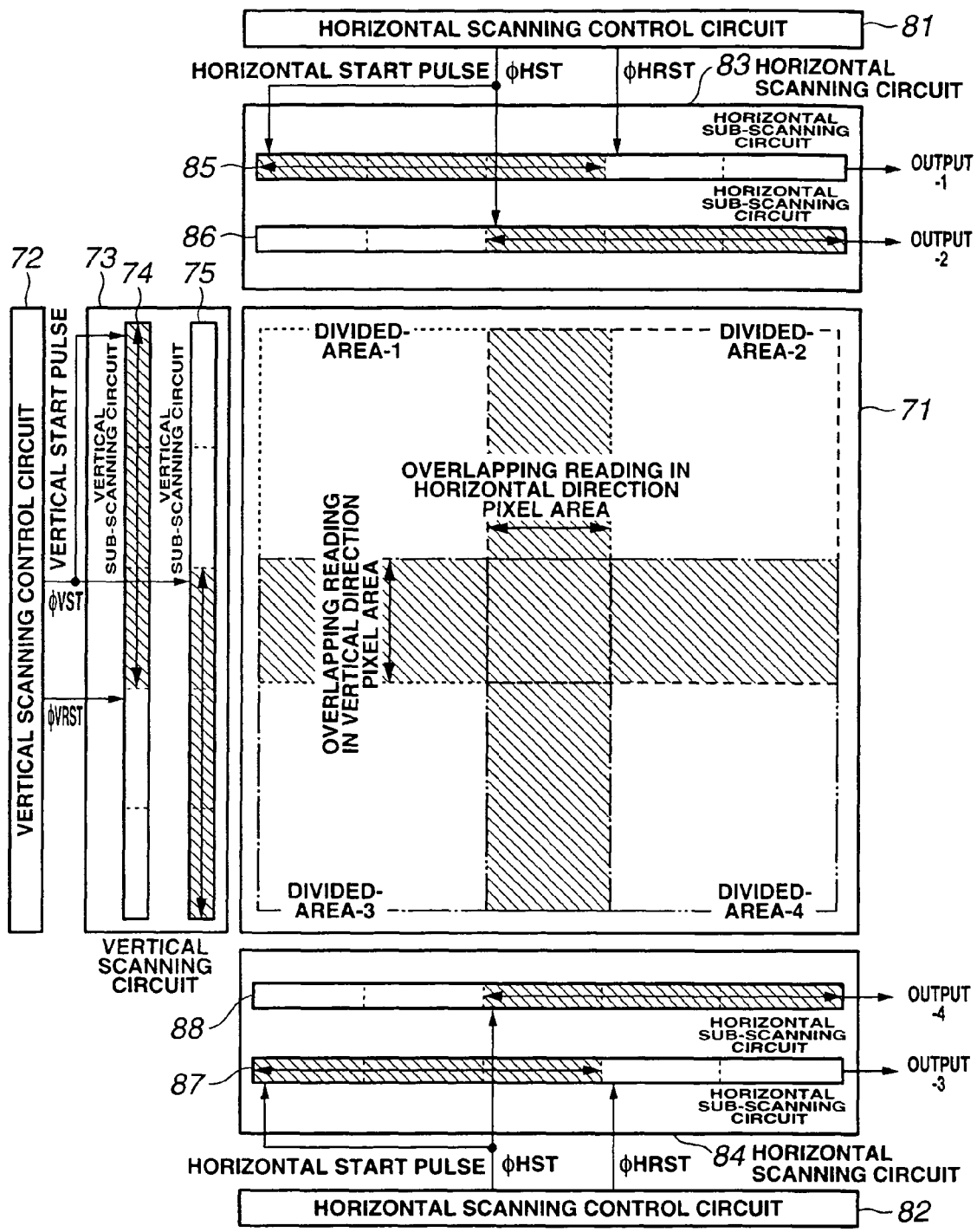
FIG. 14 is an explanatory diagram showing an image pick-up device according to the sixth embodiment of the present invention.

FIG. 14 is an explanatory diagram showing an image pick-up device according to the sixth embodiment of the present invention. According to the sixth embodiment, the image pick-up device has a pixel area (overlapped pixel area) of the overlapped pixels which overlappingly read the pixels in the pixel area.

According to the sixth embodiment, the image pick-up device comprises: a pixel area 71; a vertical driving system mainly comprising a vertical scanning control circuit 72 and a vertical scanning circuit 73; a horizontal driving system mainly comprising horizontal scanning control circuits 81 and 82 and horizontal scanning circuits 83 and 84; and an output system mainly comprising a horizontal reading circuit.

The pixel area 71 has the same structure as that of the pixel area 21 shown in FIG. 4 or the pixel area 51 shown in FIG. 8. The vertical scanning control circuit 72 has the same structure of the vertical scanning control circuit 24 shown in FIG. 4 or of the vertical scanning control circuit 54 shown in FIG. 8. The vertical scanning circuit 73 has the same structure as that of the vertical scanning circuit 25 shown in FIG. 4. The vertical sub-scanning circuits 74 and 75 in the vertical scanning circuit 73 have the same structure as that of the vertical sub-scanning circuits 26 and 27 shown in FIG. 4. The horizontal scanning control circuits 81 and 82 have the same structures of the horizontal scanning control circuits 31 and 32 shown in FIG. 4 or of the horizontal scanning control circuits 41 and 42 shown in FIG. 8. The horizontal scanning circuits 83 and 84 have the same structure as those of the horizontal scanning circuits 33 and 34 shown in FIG. 4 or of the horizontal scanning circuits 43 and 44 shown in FIG. 8. The horizontal sub-scanning circuits 85 to 88 in the horizontal scanning circuits 83 and 84 have the same structures as those of the horizontal sub-scanning circuits 35 to 38 shown in FIG. 4 or of the horizontal sub-scanning circuits 45 to 48 shown in FIG. 8.

According to the sixth embodiment, the vertical scanning control circuit 72 can vary the row positions of the vertical start pulse $\phi V_{ST}$ and the vertical reset pulse $\phi V_{RST}$ for supplying the pulses to the vertical sub-scanning circuits 74 and 75. The horizontal scanning control circuits 81 and 82 can vary the column positions of the horizontal start pulse $\phi H_{ST}$ and the horizontal reset pulse $\phi V_{RST}$ for supplying the pulses to the horizontal sub-scanning circuits 85 to 88.

A hatched portion in the pixel area 71 shown in FIG. 14 shows the pixel area (overlapped pixel area) of the pixel area of the overlapped pixels for overlappingly reading the pixels. A hatched portion in the vertical sub-scanning circuits 74 and 75 shows the pulse transfer unit which is used for the reading operation of the pixels, and the overlapped hatched portion corresponds to the overlapped scanning area in the vertical direction. A hatched area in the horizontal sub-scanning circuits 85 to 88 shows a horizontal reading circuit of the columns used for the reading operation of the pixel, and the overlapped hatched portion corresponds to the overlapped scanning area in the horizontal direction.

The overlapped scanning area in the vertical direction is determined by the vertical start pulse $\phi V_{ST}$ and the vertical reset pulse $\phi V_{RST}$ which are supplied to the vertical sub-scanning circuits 74 and 75. Similarly, the overlapped scanning area in the horizontal direction is determined by the horizontal start pulse $\phi H_{ST}$ and the horizontal reset pulse $\phi H_{RST}$ which are supplied to the horizontal sub-scanning circuits 85 to 88.

Next, the operation with the above structure according to the sixth embodiment will be described.

According to the sixth embodiment, the vertical scanning control circuit 72 changes the row positions of the vertical start pulse $\phi V_{ST}$ and the vertical reset pulse $\phi V_{RST}$ which are supplied to the vertical sub-scanning circuits 74 and 75. The horizontal scanning control circuits 81 and 82 change the column position of the horizontal start pulse $\phi H_{ST}$ and the horizontal reset pulse $\phi H_{RST}$ which are supplied to the horizontal sub-scanning circuits 85 to 88.

For example, the horizontal start pulse $\phi H_{ST}$ is supplied to the horizontal reading circuits on the second columns in the horizontal sub-scanning circuits 86 and 88. The horizontal reset pulse $\phi H_{RST}$ is supplied to the horizontal reading circuits on the fourth columns in the horizontal sub-scanning circuits 85 and 87. Consequently, the pixel column to overlappingly be read can be increased by three pixel columns in the horizontal direction.

As mentioned above, according to the sixth embodiment, the overlapping scanning areas in the horizontal direction and vertical direction are adjusted based on the unit of one pixel by changing the supply position of the vertical start pulse $\phi V_{ST}$, the vertical reset pulse $\phi V_{RST}$, the horizontal start pulse $\phi H_{ST}$ and the horizontal reset pulse $\phi H_{RST}$.

According to the sixth embodiment, the vertical driving system and the horizontal driving system are structured corresponding to the entire pixel area and therefore it is possible to increase or decrease the number of pixels which are overlappingly read at the boundary portion of the divided areas. Thus, it is possible to effectively suppress the variation in properties in every divided area. For example, the dynamic correction is possible by controlling the number of overlapped pixels in units of frame in accordance with the scene or photographing state. Thus, the frame rate can be changed within a predetermined range by properly controlling the number of overlapped pixels in accordance with a camera mode or the like in the case of using a camera used for specific photographing which can effectively photograph images by various frame rates.

Figure 15:
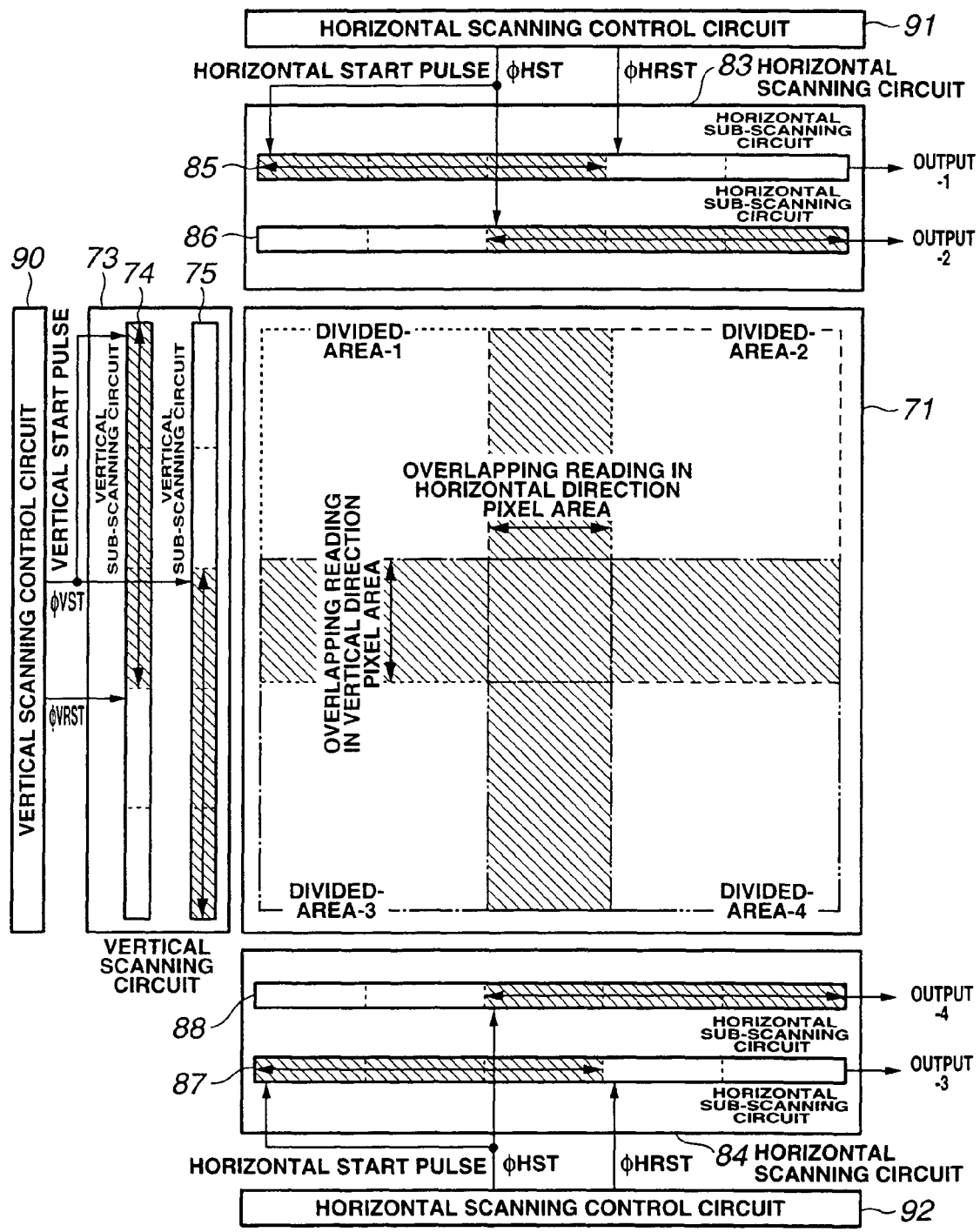
FIG. 15 is an explanatory diagram showing one example of an image pick-up device according to the seventh embodiment of the present invention.

FIG. 15 is an explanatory diagram showing an image pick-up device according to the seventh embodiment of the present invention. According to the seventh embodiment, the image can be read from the arbitrary number of divided areas in the pixel area. Referring to FIG. 15, the same reference numerals denote the same components as shown in FIG. 14, and a description thereof is omitted.

Unlike the sixth embodiment, a vertical scanning control circuit 90 and a horizontal scanning control circuit 92 are used, in place of the vertical scanning control circuit 72 and the horizontal scanning control circuits 81 and 82.

The vertical scanning control circuit 90 supplies the vertical start pulse $\phi V_{ST}$ and the vertical reset pulse $\phi V_{RST}$ to the pulse transfer unit at an arbitrary number of rows in the vertical sub-scanning circuits 74 and 75. The horizontal sub-scanning circuits 91 and 92 supply the horizontal start pulse $\phi H_{ST}$ and the horizontal reset pulse $\phi H_{RST}$ to the horizontal reading circuits at an arbitrary number of columns in the horizontal sub-scanning circuits 85 to 88.

According to the seventh embodiment, with the above structure, the divided area of the pixel area 71 is determined in accordance with the positions of the rows of the vertical start pulse $\phi V_{ST}$ and the vertical reset pulse $\phi V_{RST}$ supplied to the vertical sub-scanning circuits 74 and 75 and the positions of the columns of the horizontal start pulse $\phi H_{ST}$ and the horizontal reset pulse $\phi H_{RST}$ supplied to the horizontal sub-scanning circuits 85 to 88 Further, it is possible to arbitrarily set the numbers of the vertical start pulse $\phi V_{ST}$ and the vertical reset pulse $\phi V_{RST}$ and the numbers of the horizontal start pulse $\phi H_{ST}$ and the horizontal reset pulse $\phi H_{RST}$. The number of divided areas can freely be set.

According to the seventh embodiment, the vertical sub-scanning circuits 74 and 75 have the same structure, corresponding to the entire area of the pixel area 71 in the vertical direction. The horizontal sub-scanning circuits 85 to 88 have the same structure, corresponding to the entire area of the pixel area 71 in the horizontal direction. Therefore, the number of divided areas can properly and simply be changed.

Thus, a camera for a still image, such as a digital still camera does not necessarily need a high frame rate. In this case, the number of divided areas is reduced in accordance with the photographing situation or camera application and therefore the number of areas having the property variation is reduced. Thus, it is possible to obtain the image with high quality. The power consumption is reduced by stopping unnecessary circuit operations.

Figure 16:
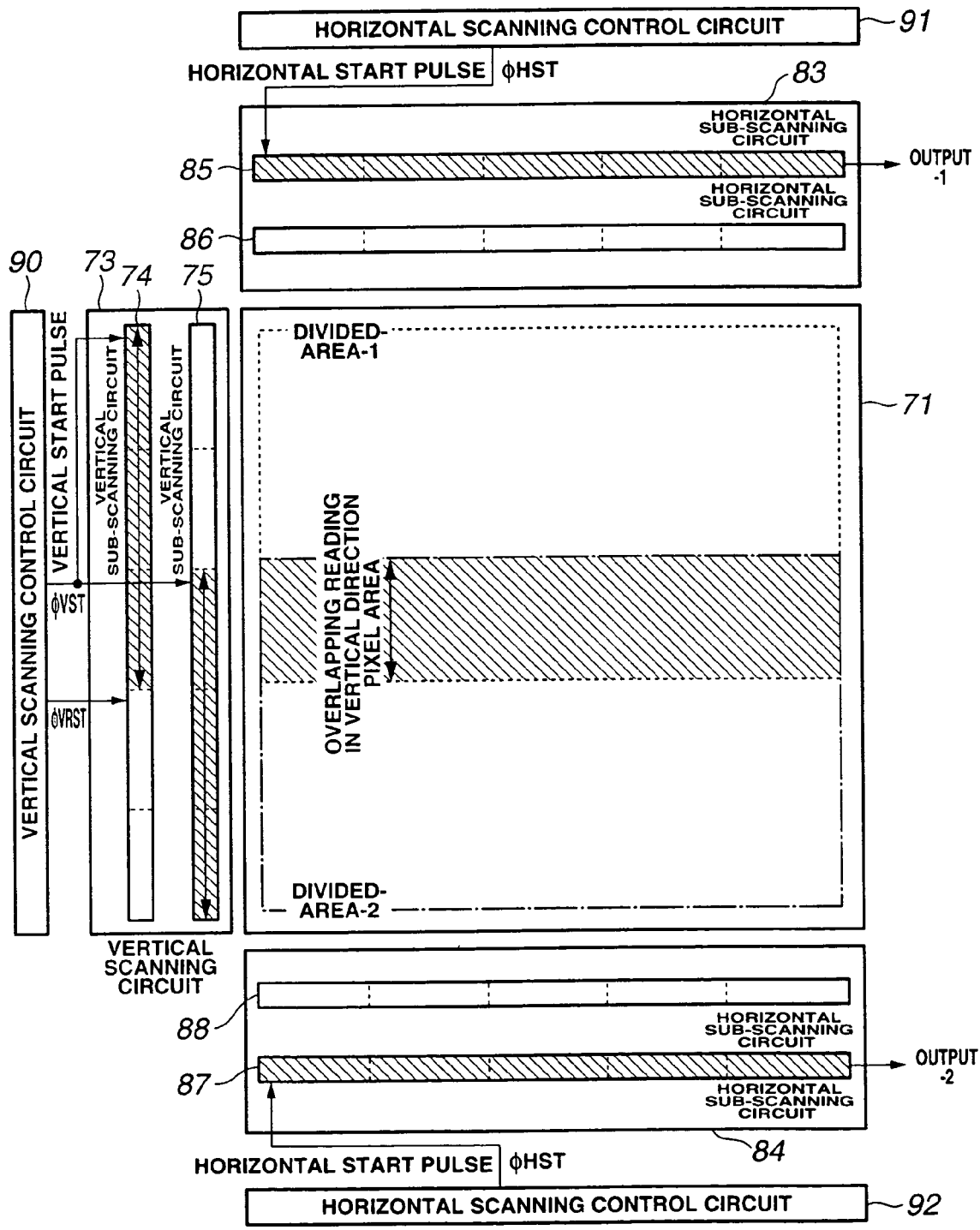
FIG. 16 is an explanatory diagram showing another example of the image pick-up device according to the seventh embodiment of the present invention.

When an image output is necessary at the high frame rate, all the vertical sub-scanning circuits and horizontal sub-scanning circuits are not necessarily used. FIG. 16 shows one example of this case, in which only the two horizontal sub-scanning circuits 85 and 87 are used.

Referring to FIG. 16, the reading operation is performed in the case of dividing the pixel area 71 into two areas in the vertical direction and into one area (that is, no division) in the horizontal direction (hereinafter, referred to as (2×1) division). In FIG. 16, a hatched portion in the pixel area 71 is an overlapped pixel area for overlapping reading. A hatched area of the vertical sub-scanning circuits 74 and 75 shows the pulse transfer unit used for the pixel reading, and the overlapped hatched range corresponds to the overlapped scanning area in the vertical direction. A hatched area of the horizontal sub-scanning circuits 85 and 87 shows a horizontal reading circuit at the column used for the pixel reading. As shown by the hatched portion in FIG. 16, the horizontal sub-scanning circuits 86 and 88 are not used for the reading operation.

For example, the horizontal scanning control circuits 91 and 92 supply the horizontal start pulse $\phi H_{ST}$ to only the horizontal sub-scanning circuits 85 and 87, thus enabling the reading shown by the hatched portion in FIG. 16.

As compared with the reading of (2×2) division, the divided area in the horizontal direction is reduced to half in the example shown in FIG. 16, and the operation of the two horizontal sub-scanning circuits 86 and 88 can be completely stopped.

Figure 17:
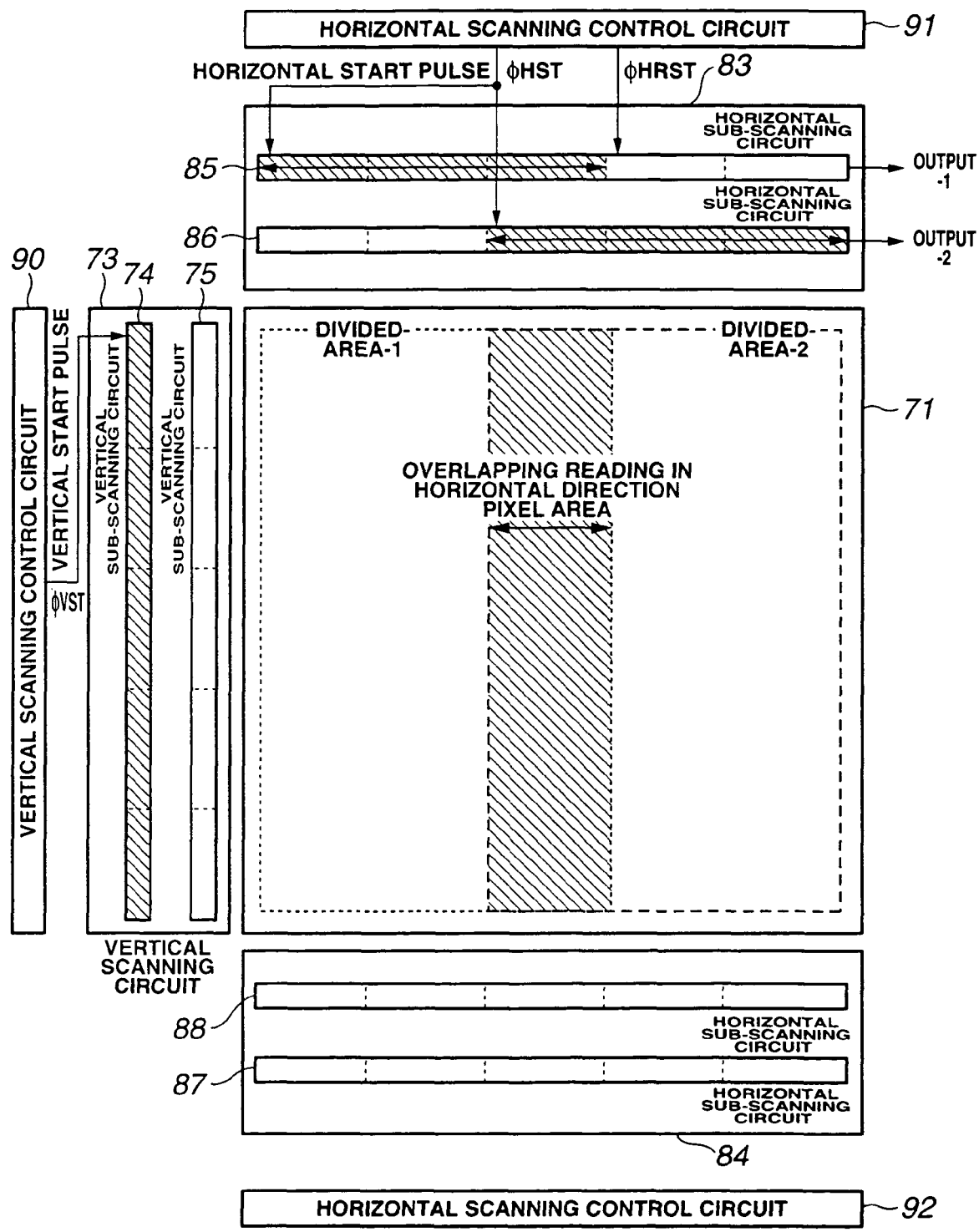
FIG. 17 is an explanatory diagram showing another example of the image pick-up device according to the seventh embodiment of the present invention.

Referring to FIG. 17, the reading operation is performed in the case of dividing the pixel area 71 into two areas in the horizontal direction and into one area (that is, no division) in the vertical direction (hereinafter, referred to as (1×2) division). In FIG. 17, a hatched portion in the pixel area 71 is an overlapped pixel area for overlapping reading. A hatched area of the vertical sub-scanning circuit 74 shows the pulse transfer unit used for the pixel reading. A hatched area of the horizontal sub-scanning circuits 85 to 88 shows a horizontal reading circuit at the column used for the pixel reading. An overlapped hatched range corresponds to the overlapped scanning area in the horizontal direction. As shown by a hatched portion in FIG. 17, the vertical sub-scanning circuit 75 is not used for the reading.

For example, the vertical scanning control circuit 90 supplies the vertical start pulse $\phi V_{ST}$ to only the vertical sub-scanning circuit 74, thus enabling the reading shown by the hatched portion in FIG. 17.

As compared with the reading of (2×2) division, the divided area in the vertical direction is reduced to half in the example shown in FIG. 17, and the operation of the vertical sub-scanning circuit 75 can be completely stopped.

Figure 18:
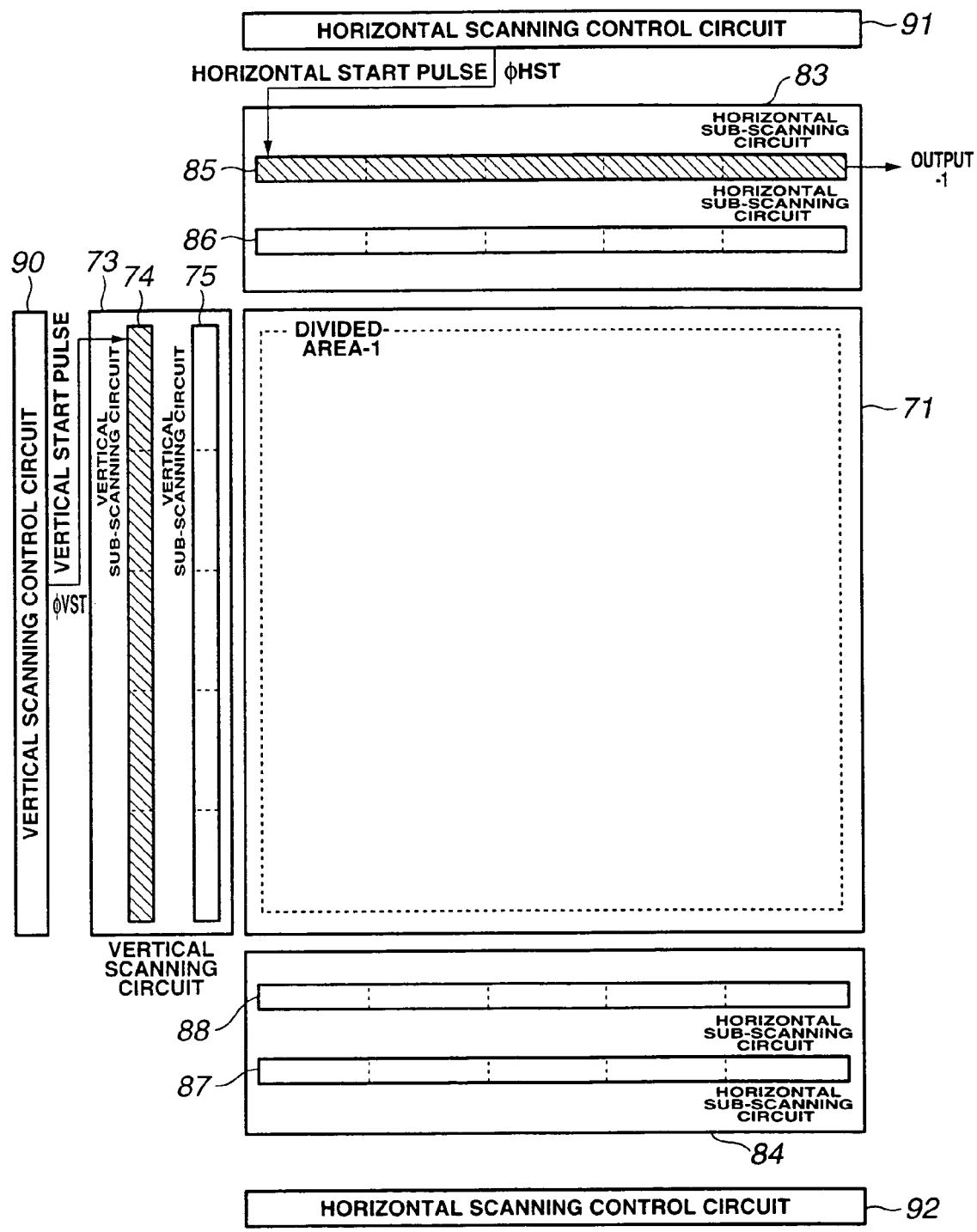
FIG. 18 is an explanatory diagram showing another example of the image pick-up device according to the seventh embodiment of the present invention.

Referring to FIG. 18, the reading operation is performed in the case of dividing the pixel area 71 into (1×1) division in the horizontal and vertical directions, namely, no division of the pixel area 71. In FIG. 18, a hatched area of the vertical sub-scanning circuit 74 shows the pulse transfer unit used for the pixel reading, and a hatched area of the horizontal sub-scanning circuit 85 shows a horizontal reading circuit at the column used for the pixel reading. As shown by the hatched portion in FIG. 18, the vertical sub-scanning circuit 75 and the horizontal sub-scanning circuits 86 to 88 are not used for the reading.

For example, the horizontal scanning control circuit 91 supplies the horizontal start pulse $\phi H_{ST}$ to only the horizontal sub-scanning circuit 85 and the vertical scanning control circuit 90 supplies the vertical start pulse $\phi V_{ST}$ to only the vertical sub-scanning circuit 74, thus enabling the reading shown by the hatched portion in FIG. 18.

As compared with the reading of (2×2) division, the divided area in the horizontal and vertical directions is reduced to half in the example shown in FIG. 18, and the operation of the vertical sub-scanning circuit 75 and the horizontal sub-scanning circuits 86 to 88 can be completely stopped.

In the examples shown in FIGS. 16 to 18, the same advantages as those described with reference to FIG. 15 are obtained.

Figure 19:
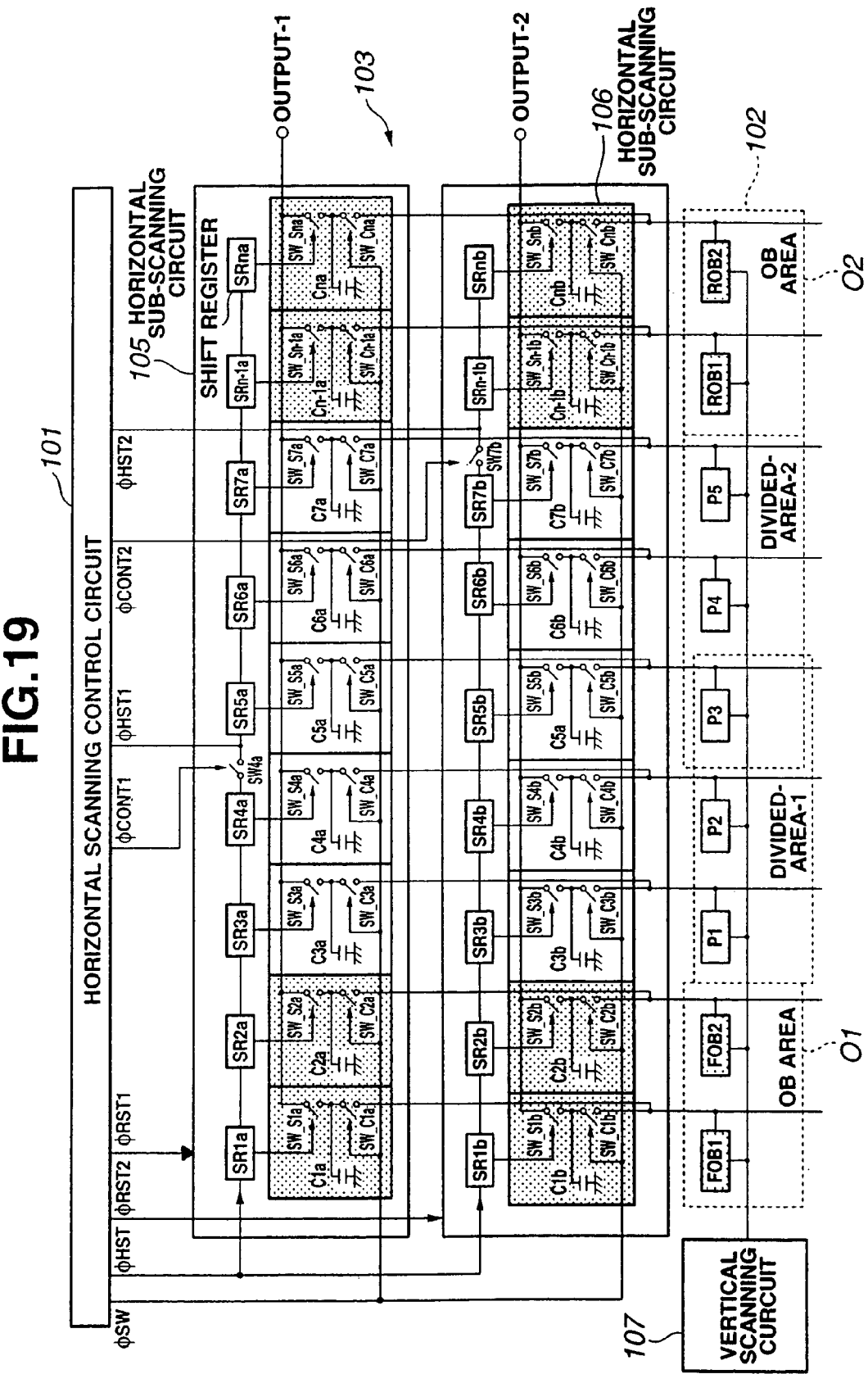
FIG. 19 is an explanatory diagram showing an image pick-up device according to the eighth embodiment of the present invention.

FIG. 19 is an explanatory diagram showing an image pick-up device according to the eighth embodiment of the present invention.

Generally, the pixel area has an optical black pixel for adjusting the black level at both-end portions. The pixel signals in the divided areas obtained according to the first to seventh embodiments are outputted via the different output systems. Therefore, in the case of adjusting the black level by using the outputs via the output systems, the adjustment of the black level changes depending on the divided area and the image quality deteriorates if no consideration of the using optical black pixel is made.

According to the eighth embodiment, it is possible to obtain the pixel signal of the common optical black pixel via the output systems for outputting the pixel signals in the divided areas. For the purpose of a brief description, FIG. 19 shows only a part of the pixel area, a part of the vertical driving system, the horizontal driving system, and the output system. Referring to FIG. 19, the image pick-up device has only one horizontal scanning circuit having the two horizontal sub-scanning circuits as the horizontal driving system. However, obviously, the image pick-up device may have two horizontal scanning circuits as the horizontal driving system, similar to that shown in FIG. 6.

The image pick-up device according to the eighth embodiment comprises: a pixel area 102; a vertical driving system comprising a vertical scanning control circuit (not shown) and a vertical scanning circuit 107; a horizontal driving system mainly comprising a horizontal scanning control circuit 101 and a horizontal scanning circuit 103; and an output system mainly comprising the horizontal reading circuit.

The pixel area 102 has the same structure as that of the pixel area 21 shown in FIG. 6. The pixel area 102 comprises pixels $P_{uv}$ with the matrix arrangement. Referring to FIG. 19, the number of pixels in the horizontal direction is 5 as one example. Pixels $P_1, P_2, \ldots$ in FIG. 19 include the photoelectric converting element $P_{uv}$ and switches $SW_{uv\_1}$ and $SW_{uv\_2}$.

The pixels all have the same structure. The structures of the vertical signal line and the row selecting line are the same in the pixels. The pixel area shown in FIG. 8 may be used.

Referring to FIG. 19, the pixel area 102 is divided in the horizontal direction into the divided-area-1 and divided-area-2 as one example. An area outside of the divided-area-1 in the pixel area 102 has an OB area O1 including two optical black pixels $FOB_1$ and $FOB_2$. An area outside of the divided-area-2 in the pixel area 102 has an OB area $O_2$ including the two optical black pixels $ROB_1$ and $ROB_2$. The pixel $P_3$ in the center is an overlapped pixel included in both the divided-area-1 and divided-area-2. Incidentally, the number of OB areas is not limited to two and may be any arbitrary number.

The vertical scanning circuit 107 has the same structure as that of the vertical sub-scanning circuit 26 shown in FIG. 6. The horizontal scanning control circuit 101 has the same structure as that of the horizontal scanning control circuit 41 shown in FIG. 6. The horizontal scanning circuit 103 has the same structure as that of the horizontal scanning circuit 43 shown in FIG. 6. The horizontal sub-scanning circuits 105 and 106 in the horizontal scanning circuit 103 have the same structure as that of the horizontal sub-scanning circuits 45 and 46 shown in FIG. 6.

The structures of the horizontal sub-scanning circuits 105 and 106 are substantially the same. The horizontal sub-scanning circuits 105 and 106 have the horizontal reading circuits corresponding to the respective columns in the pixel area 102. The horizontal reading circuit on the i-th column (including the OB areas $OB_1$ and $OB_2$ in FIG. 19, where $1 \leq i \leq 9$) in the horizontal sub-scanning circuit 105 comprises: a shift register unit $SR_{ia}$; and a switch $SW\_S_{ia}$ which is on/off controlled by a signal from the terminal of the shift register unit $SR_{ia}$. The horizontal reading circuit on the i-th column in the horizontal sub-scanning circuit 106 comprises: a shift register unit $SR_{ib}$; and a switch $SW\_S_{ib}$ which is on/off controlled by a signal from the terminal of the shift register unit $SR_{ib}$.

A sample holding circuit is arranged between the horizontal reading circuit and the vertical signal line. The sample holding circuit comprises a sampling switch and a holding capacitor. That is, a holding capacitor $C_{ia}$ is arranged between the input terminal of the horizontal reading circuit on the i-th column in the horizontal sub-scanning circuit 105 and the reference potential point, and a sampling switch $SW\_C_{ia}$ is arranged between the input terminal of the horizontal reading circuit on the i-th column in the horizontal sub-scanning circuit 105 and the vertical signal line on the corresponding column. Similarly, a holding capacitor $C_{ib}$ is arranged between the input terminal of the horizontal reading circuit on the i-th column in the horizontal sub-scanning circuit 106 and the reference potential point, and a sampling switch $SW\_C_{ib}$ is arranged between the input terminal of the horizontal reading circuit on the i-th column in the horizontal sub-scanning circuit 106 and the vertical signal line on the corresponding column.

These structures are the same as those in the horizontal sub-scanning circuits 45 and 46 shown in FIG. 6.

The horizontal scanning control circuit 101 supplies, to the horizontal sub-scanning circuits 105 and 106, a sample holding control signal φSW, horizontal start pulses $\phi H_{ST}$, $\phi H_{ST1}$, and $\phi H_{ST2}$, horizontal reset pulses $\phi RST_1$ and $\phi RST_2$, and control clocks $\phi CONT_1$ and $\phi CONT_2$.

According to the eighth embodiment, a transfer control switch $SW_{4a}$ is arranged between shift register units $SR_{4a}$ and $SR_{5a}$ in the horizontal sub-scanning circuit 105. A transfer control switch $SW_{7b}$ is arranged between shift register units $SR_{7b}$ and $SR_{n-1b}$ in the horizontal sub-scanning circuit 106. The transfer control switches $SW_{4a}$ and $SW_{7b}$ are respectively on/off controlled by the control clocks $\phi CONT_1$ and $\phi CONT_2$, thereby stopping the operation of the shift register units. The transfer control switches $SW_{4a}$ and $SW_{7b}$ control the start position for reading an optical black pixel signal (hereinafter, referred to as an OB pixel signal) from the OB area $O_2$.

Figure 20:
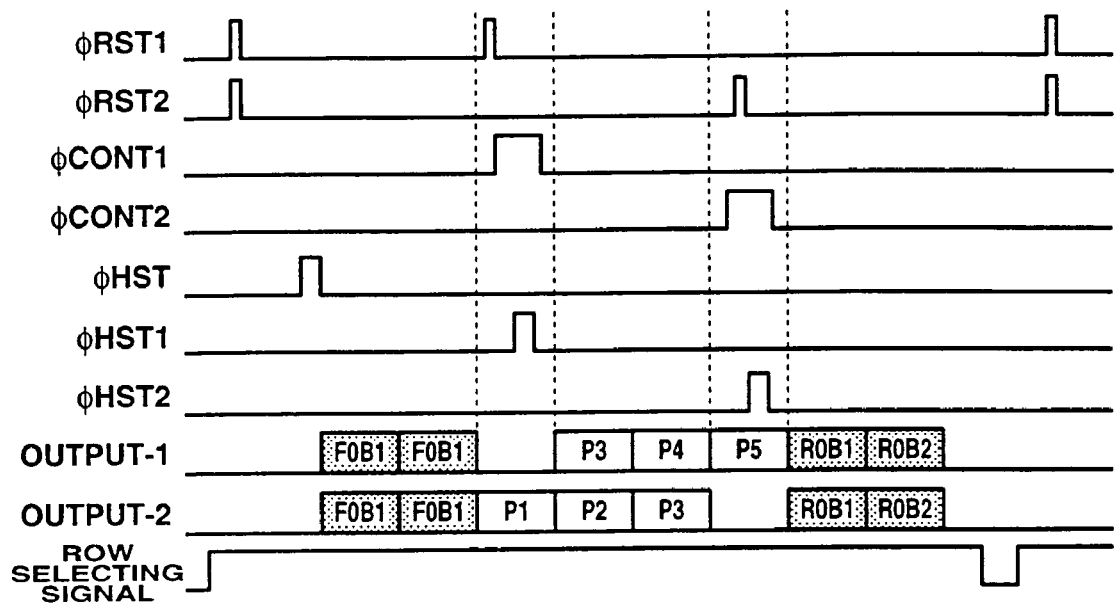
FIG. 20 is a timing chart for explaining the operation according to the eighth embodiment of the present invention.

Next, the operation according to the eighth embodiment will be described with reference to FIG. 20. FIG. 20 shows one example of the method for reading the pixel signal. According to the eighth embodiment, the horizontal scanning period is also divided into a reading period for supplying and storing the signal from each of the pixels to their sample holding circuits and an output period for outputting the pixel signals stored in the sample holding circuits. FIG. 20 shows the signals in the output period.

The vertical scanning circuit 107 outputs the "H" row selecting signal to the row selecting line on the first row in the pixel area 102, thus supplying, to the corresponding vertical signal line, the pixel signals of all the pixels including the optical black pixel at the first row.

In the reading period, the sampling switches in the horizontal sub-scanning circuits 105 and 106 are switched on by the sample holding control signal φSW from the horizontal scanning control circuit 101. Consequently, the pixel signals on the first row are stored in the holding capacitors $C_{ia}$ to $C_{ib}$ via the sampling switches $SW\_C_{ia}$ and $SW\_C_{ib}$ in the horizontal sub-scanning circuits 105 and 106 through the vertical signal line of the corresponding column. Consequently, the pixel signals of all the pixels on the first row selected by the vertical scanning circuit 107 are held in the sample holding circuits in the horizontal scanning circuits 105 and 106.

A reset pulse $\phi RST_1$ is supplied to the horizontal sub-scanning circuit 105 and a reset pulse $\phi RST_2$ respectively is supplied to the horizontal sub-scanning circuit 106, thereby resetting the node in the shift register unit. Next, the horizontal start pulse $\phi H_{ST}$ is supplied to the shift register units at the first column. Thus, pixel signals $FOB_1$ and $FOB_2$ corresponding respectively to the holding capacitors $C_{1a}$ and $C_{2a}$ in the horizontal reading circuits are outputted as the outputs 1 via sampling switches $SW\_S_{1a}$ and $SW\_S_{2a}$. Also, pixel signals $FOB_1$ and $FOB_2$ corresponding respectively to the holding capacitors $C_{1b}$ and $C_{2b}$ in the horizontal reading circuits are outputted as the output 2 via sampling switches $SW\_S_{1b}$ and $SW\_S_{2b}$.

After outputting the OB pixel signal, the horizontal sub-scanning circuit 105 outputs the OB pixel signal, then supplies the reset pulse $\phi RST_1$ again, and resets the node in the shift register unit. Next, the control clock $\phi CONT_1$ switches off the switch $SW_{4a}$, thereby inputting the horizontal start pulse $\phi H_{ST1}$ for scanning the shift register unit corresponding to the columns from the divided-area-2 to the OB area $O_2$ to the corresponding position of the shift register in the horizontal sub-scanning circuit 105, namely, between the switch $SW_{4a}$ and the shift register unit $SR_{5a}$.

Thus, selecting pulses generated by the horizontal start pulses $\phi H_{ST1}$ are sequentially transferred from the reading start position of the divided-area-2, thereby outputting, at the output-1, the pixel signals $P_3$, $P_4$, and $P_5$ corresponding to the divided-area-2 stored in the holding capacitors $C_{5a}$, $C_{6a}$, and $C_{7a}$ via the switches $SW\_S_{5a}$, $SW\_S_{6a}$, and $SW\_S_{7a}$. In the OB area O2 at the latter stage, the signals are sequentially scanned, thereby reading OB pixel signals $ROB_1$ and $ROB_2$ at the latter stage stored in the holding capacitors $C_{n-1a}$ and $C_{na}$ via the switches $SW\_S_{n-1a}$ and $SW\_S_{na}$. Then, the scanning ends.

By the horizontal start pulses $\phi H_{ST}$ inputted to the horizontal sub-scanning circuit 106, the pixel signals $FOB_1$ and $FOB_2$ are outputted via sampling switches SW_S$_{1a}$, SW_S$_{2a}$, SW_S$_{1b}$, and SW_S$_{2b}$. Further, the selecting pulses are sequentially transferred through the shift registers, and the pixel signals P$_1$, P$_2$, and P$_3$ in the divided-area-1 are outputted from the holding capacitors C$_{3b}$, C$_{4b}$, and C$_{5b}$ via the sampling switches SW_S$_{3b}$, SW_S$_{4b}$, and SW_S$_{5b}$.

After scanning the divided-area-1, a reset pulse φRST$_2$ is supplied to the horizontal sub-scanning circuit 106, thereby resetting the node in the shift register. Next, the control clock φCONT$_2$ switches off the switch SW$_{7b}$, thereby inputting the horizontal start pulse φH$_{ST2}$ for scanning the shift register unit corresponding to the OB area O$_2$ to the position of the shift register unit in the horizontal sub-scanning circuit 106, namely, between the transfer control switch SW$_{7b}$ and the shift register unit SR_S$_{nb}$. Thus, the OB pixel signals ROB$_1$ and ROB$_2$ stored in the holding capacitors C$_{n-1b}$ and C$_{nb}$ are read via the sampling switches SW_S$_{n-1b}$ and SW_S$_{nb}$. Then, the scanning ends.

As mentioned above, according to the eighth embodiment, the same outputs from the OB pixel areas are obtained for the respective read divided areas. The OB pixels are shielded for prescribing the black level of the video signals. The OB pixels may basically be arranged at any place as long as the place has no problems relating to properties and the place is in a non-light-receiving unit of the solid-state pick-up device. Therefore, in the image pick-up device for dividing the pixel portions and reading them, the same OB pixel is read by the reading circuit in every different divided area and thus it is possible to monitor in real-time and correct the property variation of the reading circuit on the black level at the latter circuit.

The same optical black pixel among the output systems may be read and all the optical black pixels need not necessarily be read.

Figure 21:
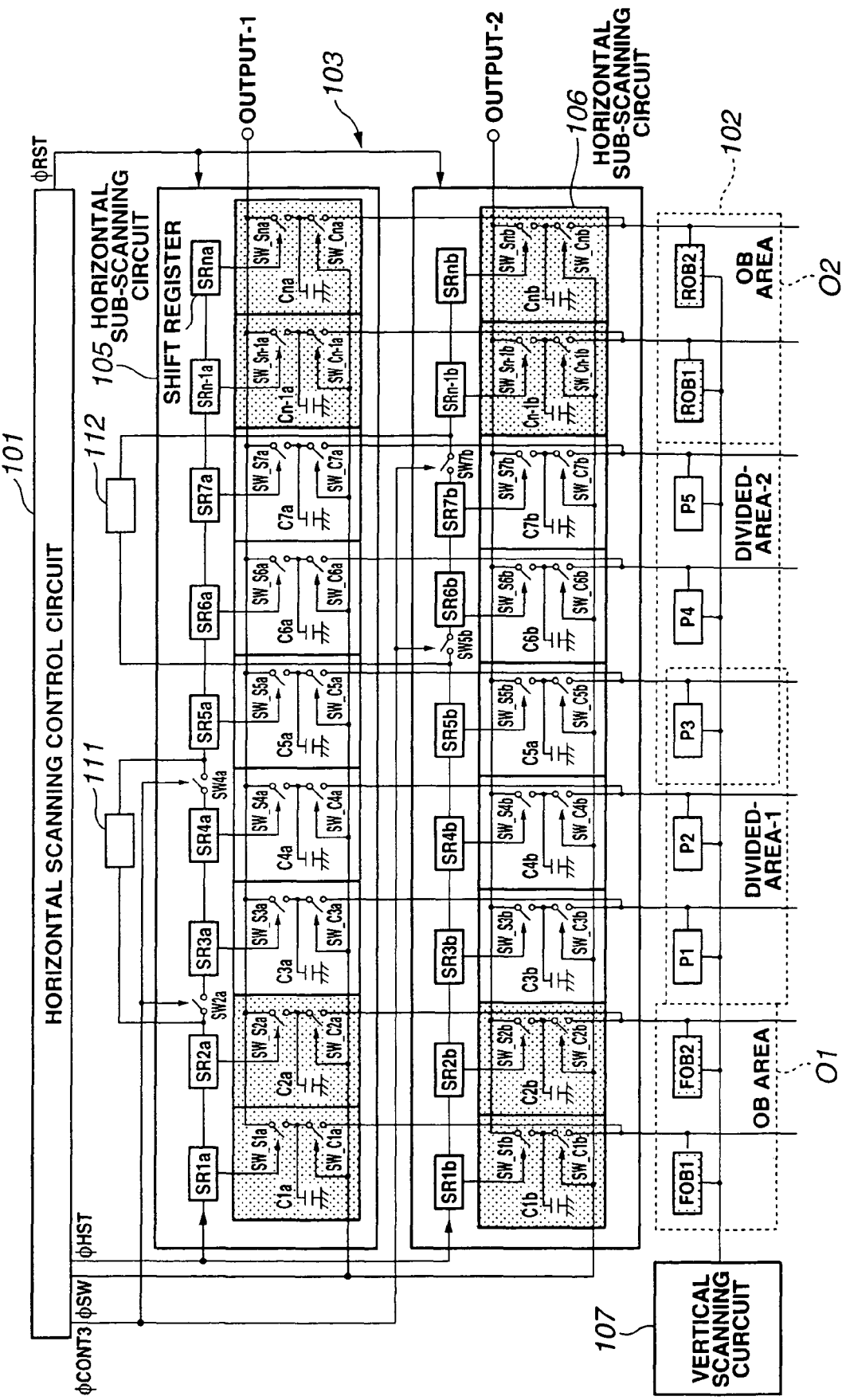
FIG. 21 is an explanatory diagram showing an image pick-up device according to the ninth embodiment of the present invention.

FIG. 21 is an explanatory diagram showing an image pick-up device according to the ninth embodiment of the present invention. Referring to FIG. 21, the same components as those shown in FIG. 19 are designated by the same reference numerals and a description thereof is omitted.

According to the eighth embodiment, a free time in which the pixel signal is not read is generated. However, according to the ninth embodiment, the free time generation is prevented by transferring the pulses for designating the pixel signal to be read.

According to the ninth embodiment, unlike the according to the eighth embodiment with reference to FIG. 19, transfer control switches SW$_{2a}$ and SW$_{5b}$ and transfer units 111 and 112 are added. The transfer control switch SW$_{2a}$ is arranged between the shift register units SR$_{2a}$ and SR$_{3a}$ in the horizontal sub-scanning circuit 105. The transfer control switch SW$_{5b}$ is arranged between the shift register units SR$_{5b}$ and SR$_{6b}$ in the horizontal sub-scanning circuit 106. The transfer control switches SW$_{2a}$ and SW$_{5b}$ and transfer control switches SW$_{5b}$ and SW$_{7b}$ are on/off controlled by a control clock φCONT$_3$.

The transfer unit 111 transfers output pulses of the shift register unit SR$_{2a}$ and supplies the transferred output pulses to the shift register unit SR$_{5a}$. The transfer unit 112 transfers output pulses of the shift register units SR$_{5b}$ and supplies the transferred output pulses to the shift register units SR$_{n-1b}$.

The transfer units 111 and 112 thin out the shift register unit corresponding to the column which is not read. The transfer units 111 and 112 may only comprise simple metallic wiring to connect the shift register units, or may have a buffer function which is controlled by clocks. However, preferably, the delay time of pulses transferred by the transfer units 111 and 112 may be suppressed to the low level.

Figure 22:
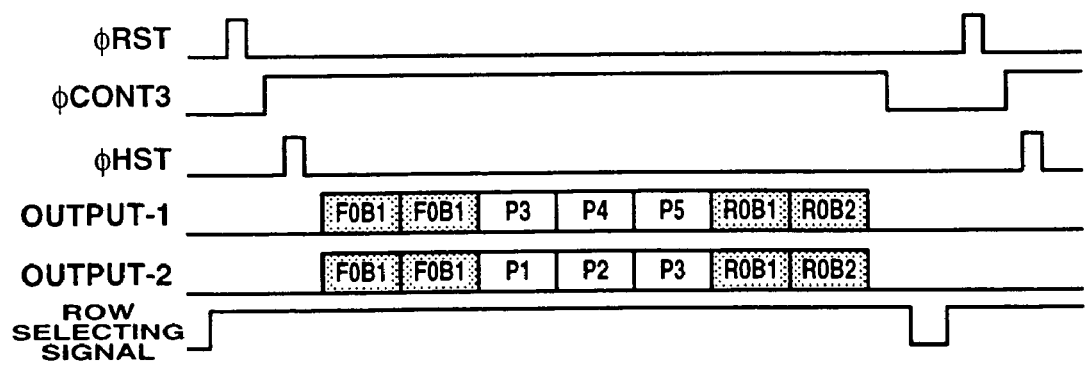
FIG. 22 is a timing chart for explaining the operation according to the ninth embodiment.

Next, a description is given of the operation with the above structure according to the ninth embodiment with reference to FIG. 22. FIG. 22 shows one example of the method for reading the pixel signal. According to the ninth embodiment, the horizontal scanning period is also divided into a reading period for supplying and storing the signal from the pixels to the sample holding circuit and an output period for outputting the pixel signals stored in the sample holding circuit. FIG. 22 shows the signals in the output period.

The vertical scanning circuit 107 outputs the "H" row selecting signal to the row selecting line on the first row in the pixel area 102, thus supplying, to the corresponding vertical signal line, the pixel signals of all the pixels including the optical black pixels at the first row.

In the reading period, the respective sampling switches in the horizontal sub-scanning circuits 105 and 106 are switched on by the sample holding control signal φSW sent from the horizontal scanning control circuit 101. Consequently, the pixel signals at the first row are stored in the holding capacitors C$_{ia}$ to C$_{ib}$ via the sampling switches SW_C$_{ia}$ and SW_C$_{ib}$ in the horizontal sub-scanning circuits 105 and 106 from the vertical signal line of the corresponding column. Consequently, the pixel signals of all the pixels at the first row selected by the vertical scanning circuit 107 are held in the sample holding circuits in the horizontal scanning circuits 105 and 106.

The reset pulse φRST is supplied to the horizontal sub-scanning circuits 105 and 106, thereby resetting the node in the shift register unit. Next, a control clock φCONT$_3$ is inputted in the horizontal sub-scanning circuit 105, thereby switching off the switches SW$_{2a}$ and SW$_{4a}$. Then, a clock transfer system of the shift register unit SR$_{2a}$, the transfer unit 111, and the shift register unit SR$_{5a}$ is formed. Similarly, the control clock φCONT$_3$ is inputted in the horizontal sub-scanning circuit 106, thereby switching off the switches SW$_{5b}$ and SW$_{7b}$. Then, a clock transfer system of the shift register unit SR$_{5b}$, the transfer unit 112, and the shift register unit SR$_{n-1b}$ is formed.

Next, the horizontal start pulse φH$_{ST}$ is supplied to the shift register units SR$_{1a}$ and SR$_{1b}$ of the first state. Thus, the optical black pixel signals FOB$_1$ and FOB$_2$ held in the holding capacitors C$_{1a}$, C$_{2a}$, C$_{1b}$, and C$_{2b}$ in the horizontal reading circuits are outputted as the outputs 1 and 2 via the switches SW_S$_{1a}$ and SW_S$_{2a}$ and switches SW_S$_{1b}$ and SW_S$_{2b}$.

Since the switch SW$_{2a}$ is switched off in the horizontal sub-scanning circuit 105, the horizontal start pulse φH$_{ST}$ is not transmitted to the shift register unit SR$_{3a}$ and is supplied to the input terminal of the shift register unit SR$_{5a}$ via the transfer unit 111. That is, in the divided-area-1, the processing skips the operation for reading of the signals from the holding capacitors C$_{3a}$ and C$_{4a}$, which store the pixel signals of the pixels P$_1$ and P$_2$ corresponding to the shift register units SR$_{3a}$ and SR$_{4a}$, via the switches SW_S$_{3a}$ and SW_S$_{4a}$.

Next, the horizontal start pulse φH$_{ST}$ is sequentially transferred to the shift register units SR$_{5a}$, SR$_{6a}$, and SR$_{7a}$. Thus, the pixels signals P$_3$, P$_4$, and P$_5$ in the divided-area-2 stored in the holding capacitors C$_{5a}$, C$_{6a}$, and C$_{7a}$ are outputted as the outputs 1 via the SW_S$_{5a}$, SW_S$_{6a}$, and SW_S$_{7a}$. In the OB area O$_2$ at the latter stage, the signals are sequentially scanned, thereby reading the OB pixel signals ROB$_1$ and ROB$_2$ stored in the holding capacitors C$_{n-1a}$ and C$_{na}$ via the switches SW_S$_{n-1a}$ and SW_S$_{na}$. Consequently, the scanning operation ends.

A similar operation is performed in the horizontal reading circuit in the horizontal sub-scanning circuit 106. That is, by the horizontal start pulse φH$_{ST}$, the OB pixel signals FOB$_1$ and FOB$_2$ are read from the holding capacitors C$_{1b}$ and C$_{2b}$ via the switches SW_$S_{1b}$ and SW_$S_{2b}$. Further, the horizontal start pulse $\phi H_{ST}$ is transferred in the shift registers $SR_{3b}$, $SR_{4b}$, and $SR_{5b}$ and is outputted from the holding capacitors $C_{3b}$, $C_{4b}$, and $C_{5b}$, which hold the pixel signals $P_1$, $P_2$, and $P_3$ in the divided-area-1, via the switches SW_$S_{3b}$, SW_$S_{4b}$, and SW_$S_{5b}$.

The switches $SW_{2a}$ and $SW_{5b}$ are switched off. Thus, the horizontal start pulse $\phi H_{ST}$ is not transmitted to the shift register unit $SR_{6b}$ but is supplied to the input terminal of the shift register unit $SR_{7b}$ via the transfer unit 112. That is, in the divided-area-2, the processing skips the operation for reading of the signals from the holding capacitors $C_{6b}$ and $C_{7b}$, which store the pixel signals of the pixels $P_4$ and $P_5$ corresponding to the shift register units $SR_{6b}$ and $SR_{7b}$, via the switches SW_$S_{6b}$ and SW_$S_{7b}$.

Next, the horizontal start pulse $\phi H_{ST}$ is sequentially transferred to the shift register units $SR_{n-1b}$ and $SR_{nb}$. Thus, the selecting pulses are transferred from the reading start position of the OB area $O_2$, thereby outputting, as the outputs 2, the OB pixel signals $ROB_1$ and $ROB_2$ stored in the holding capacitors $C_{n-1b}$ and $C_{nb}$ via the switches SW_$S_{n-1b}$ and SW_$S_{nb}$. Consequently, the scanning operation ends.

As mentioned above, the outputs including the same OB pixel signals $FOB_1$ and $FOB_2$ and the OB pixel signals $ROB_1$ and $ROB_2$ are obtained from either one of the output systems for outputting the pixel signal in the divided-area-1 and the output system for outputting the pixel signal in the divided-area-2.

As mentioned above, according to the ninth embodiment, in the image pick-up device which divides the pixel portion into a plurality of areas and reads the areas, the same OB pixels are read by the reading circuit in every different divided area. Consequently, the circuit at the latter circuit monitors and corrects in real-time the property variation in the reading circuit on the black level and the free time in which the reading operation is not performed is removed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pick-up device comprising:
   a vertical scanning circuit comprising a plurality of sub-scanning circuits;
   a horizontal scanning circuit comprising a plurality of sub-scanning circuits; and
   a pixel portion having a matrix arrangement of pixels each located at corresponding respective intersecting points of a first plurality of signal lines arranged in a first direction and a second plurality of signal lines arranged in a second direction, said pixel portion converting an optical subject image into an electric signal, to which at least one of the vertical scanning circuit and the horizontal scanning circuit is connected such that all of the plurality of sub-scanning circuits of their scanning circuit share the respective signal lines of their scanning circuit.

2. The image pick-up device according to claim 1, wherein the pixel portion comprises:
   a photoelectric converting unit for converting the optical subject image into a signal;
   a first switch for outputting the pixel signal from the photoelectric converting unit by using a row selecting signal from one sub-scanning circuit of a plurality of sub-scanning circuits; and
   a second switch for outputting the pixel signal from the photoelectric converting unit by using a row selecting signal from another sub-scanning circuit of the plurality of sub-scanning circuits.

3. The image pick-up device according to claim 1 wherein said scanning circuits are configured so that the pixel matrix is divided into pairs of regions and the pixels of the regions are read so that only pixels in overlapping regions are read more than once whereas pixels in the remaining regions are read only once.

4. The image pick-up device according to claim 1, further comprising:
   the horizontal scanning circuit being connected to all of the pixels, and configured to scan in a horizontal direction an electric signal photoelectrically converted by pixels arranged in a horizontal direction of the matrix; and
   the vertical scanning circuit being connected to all of the pixels, for scanning an electric signal photoelectrically converted by pixels arranged in a vertical direction of the matrix, wherein
   the pixel portion is divided into a plurality of pixel areas in at least one of the horizontal direction and the vertical direction,
   at least one of the plurality of horizontal sub-scanning circuits and the plurality of vertical sub-scanning circuits in the direction in which the pixel area portion is divided, being connected to all of the pixels, and
   one of the plurality of horizontal sub-scanning circuits and the plurality of vertical sub-scanning circuits are configured to read out an electric signal simultaneously from each of the divided pixel areas.

5. The image pick-up device according to claim 4, wherein a number of the horizontal sub-scanning circuits included in the horizontal scanning circuit is equal to a number of pixel areas in the horizontal direction.

6. The image pick-up device according to claim 4, wherein a number of the vertical sub-scanning circuits included in the vertical scanning circuit is equal to a number of pixel areas in the vertical direction.

7. The image pick-up device according to claim 4, wherein at least one of the horizontal scanning circuit and the vertical scanning circuit include a scanning control circuitry for adjusting a position where the pixel areas are divided.

8. The image pick-up device according to claim 4, wherein adjacent divided areas of the pixel portion, which is divided into the plurality of areas in at least one of the horizontal direction and vertical direction, include pixels common to the adjacent divided areas, and
   at least one of the horizontal scanning circuit and the vertical scanning circuit include a scanning control for adjusting a size of overlapping scanning regions which are a part of the divided areas that include the common pixels.

9. An image pick-up device comprising:
   a vertical scanning circuit comprising a plurality of sub-scanning circuits;
   a horizontal scanning circuit; and
   a pixel portion having a plurality of pixels having a matrix arrangement of pixels each located at corresponding respective intersecting points of a first plurality of signal lines arranged in a first direction and a second plurality of signal lines arranged in a second direction, said pixel portion converting an optical subject image into an electric signal, to which at least one of the vertical scanning circuit and a horizontal scanning circuit is connected such that all of the plurality of sub-scanning circuits share respective ones of said signal lines; and wherein the horizontal scanning circuit has a plurality of sub-scanning circuits, the horizontal scanning circuit being configured for temporarily storing an electric signal transferred from one of said pixels for reading a pixel signal read via a vertical signal line, by holding the pixel signal via the vertical signal line of each system.

10. The image pick-up device according to claim 9, wherein the pixel portion comprises:

a photoelectric converting unit for converting the optical subject image into a signal;

a first switch for outputting the pixel signal from the photoelectric converting unit by using a row selecting signal from one sub-scanning circuit of a plurality of sub-scanning circuits; and a second switch for outputting the pixel signal from the photoelectric converting unit by using a row selecting signal from another sub-scanning circuit of the plurality of sub-scanning circuits.

11. The image pick-up device according to claim 9 wherein said scanning circuits are configured so that the pixel matrix is divided into pairs of regions and the pixels of the regions are read so that only pixels in overlapping regions are read more than once whereas pixels in the remaining regions are read only once.

* * * * *

UNITED STATES PATENT AND TRADEMARK OFFICE
CERTIFICATE OF CORRECTION

| | | |
|---|---|---|
| PATENT NO. | : 7,746,399 B2 | Page 1 of 1 |
| APPLICATION NO. | : 10/831527 | |
| DATED | : June 29, 2010 | |
| INVENTOR(S) | : Itoh et al. | |

It is certified that error appears in the above-identified patent and that said Letters Patent is hereby corrected as shown below:

At column 2, line 25, delete "$P_{an}$" and insert --$P_{nn}$--.
At column 4, lines 36-37, delete "The each" and insert --Each--.
At column 19, line 2, delete "88 Further" and insert --88. Further--.
At column 20, line 41, delete "of the using" and insert --of using the--.
At column 25, line 4, delete "$C_{3b}\ C_{4b}$," and insert --$C_{3b}$, $C_{4b}$,--.

Signed and Sealed this
Twenty-second Day of November, 2011

David J. Kappos
*Director of the United States Patent and Trademark Office*